US008862154B2

(12) United States Patent
Jeong et al.

(10) Patent No.: US 8,862,154 B2
(45) Date of Patent: Oct. 14, 2014

(54) LOCATION MEASURING METHOD AND APPARATUS USING ACCESS POINT FOR WIRELESS LOCAL AREA NETWORK SERVICE

(75) Inventors: Seung-Hyuk Jeong, Seoul (KR); Joo-Seong Jeon, Anyang-si (KR); Tae-Sook Ha, Anyang-si (KR)

(73) Assignee: KT Corporation, Seongnam (KR)

( * ) Notice: Subject to any disclaimer, the term of this patent is extended or adjusted under 35 U.S.C. 154(b) by 152 days.

(21) Appl. No.: 13/230,408

(22) Filed: Sep. 12, 2011

(65) Prior Publication Data
US 2013/0065615 A1 Mar. 14, 2013

(51) Int. Cl.
*H04W 24/00* (2009.01)
*H04W 64/00* (2009.01)
*G01S 5/02* (2010.01)
*G01S 1/68* (2006.01)

(52) U.S. Cl.
CPC .................. *G01S 5/02* (2013.01); *H04W 64/00* (2013.01); *G01S 1/68* (2013.01)
USPC ...................... 455/456.3; 455/456.1; 342/450; 342/463

(58) Field of Classification Search
CPC ......... H04W 4/02; H04W 4/023; H04W 4/04; H04W 64/003; H04W 64/00
USPC ............... 455/456.1–457; 342/463, 450, 462, 342/357.2–357.25, 357.44, 357.66
See application file for complete search history.

(56) References Cited

U.S. PATENT DOCUMENTS

| 6,546,258 B1 * | 4/2003 | Nohara et al. ............. 455/456.1 |
| 6,694,142 B1 | 2/2004 | Kuwahara et al. |
| 2007/0279281 A1 * | 12/2007 | Oda et al. ................. 342/357.06 |
| 2009/0011779 A1 * | 1/2009 | MacNaughtan et al. ... 455/456.6 |
| 2010/0039929 A1 | 2/2010 | Cho et al. |
| 2010/0099375 A1 * | 4/2010 | Rowitch ..................... 455/404.2 |
| 2010/0265092 A1 | 10/2010 | Kim et al. |

FOREIGN PATENT DOCUMENTS

| KR | 20010067044 A | 7/2001 |
| KR | 20080053116 A | 6/2008 |
| KR | 20080074971 | 8/2008 |
| KR | 20090055104 A | 6/2009 |
| KR | 20100030349 A | 3/2010 |
| KR | 10-2011-0112093 | 10/2011 |
| KR | 20110112094 A | 10/2011 |
| WO | 2007056738 A2 | 5/2007 |

* cited by examiner

*Primary Examiner* — Marcos Torres
(74) *Attorney, Agent, or Firm* — Sughrue Mion, PLLC

(57) ABSTRACT

A method and apparatus for measuring a location of a communication terminal using an access point for a wireless local area network service is provided. The method includes storing access point information collected at each location, extracting information of nearby access points collected together at a location, where information of a reference access point is collected, from the access point information, calculating a barycentric coordinate using location coordinates of the extracted nearby access points, and determining the calculated barycentric coordinate as a final location of the communication terminal.

24 Claims, 22 Drawing Sheets

FIG. 4

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 3 | AM 9.15 | 14/15 | 111.121 | -40dB | 2 |
| | | | 111.122 | -80dB | |
| | | | 111.111 | -90dB | |
| | | | 111.114 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -40dB | |
| | | | 111.118 | -70dB | |
| | | | 111.117 | -80dB | |
| N | AM 11.13 | 30/25 | 111.131 | -50dB | 1 |
| | | | 111.122 | -40dB | |
| | | | 111.133 | -70dB | |
| | | | 111.111 | -100dB | |

FIG. 6

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -60dB | |
| | | | 111.118 | -70dB | |
| | | | 111.117 | -80dB | |
| N | AM 11.13 | 30/25 | 111.131 | -50dB | 1 |
| | | | 111.122 | -40dB | |
| | | | 111.133 | -70dB | |
| | | | 111.111 | -100dB | |

FIG. 7

| GROUP | TIME | LOCATION(LATITUDE /LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -60dB | |
| | | | 111.118 | -70dB | |
| | | | 111.117 | -80dB | |

FIG. 8

| LOCATION(LATITUDE/LONGITUDE) | MAC ADDRESS | RSSI |
|---|---|---|
| 12/15 | 111.111 | −50dB |
| 13/15 | 111.117 | −50dB |
| 15/17 | 111.121 | −50dB |
| 20/21 | 111.113 | −60dB |
| ⋮ | ⋮ | ⋮ |
| 20/21 | 111.118 | −70dB |
| 15/17 | 111.127 | −70dB |
| 15/17 | 111.129 | −70dB |
| 12/15 | 111.114 | −100dB |
| 13/15 | 111.119 | −100dB |

FIG. 12

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
|   |   |   | 111.112 | -40dB |   |
|   |   |   | 111.113 | -70dB |   |
|   |   |   | 111.114 | -100dB |   |
| 2 | AM 9.13 | 13/15 | 111.117 | -50dB | 1 |
|   |   |   | 111.112 | -40dB |   |
|   |   |   | 111.118 | -70dB |   |
|   |   |   | 111.119 | -100dB |   |
| 3 | AM 9.15 | 14/15 | 111.121 | -40dB | 2 |
|   |   |   | 111.122 | -80dB |   |
|   |   |   | 111.111 | -90dB |   |
|   |   |   | 111.114 | -100dB |   |
| 4 | AM 9.17 | 15/17 | 111.121 | -50dB | 1 |
|   |   |   | 111.112 | -80dB |   |
|   |   |   | 111.127 | -70dB |   |
|   |   |   | 111.129 | -70dB |   |
| ⋮ | ⋮ | ⋮ | ⋮ | ⋮ | ⋮ |
| N-1 | AM 11.11 | 20/21 | 111.125 | -60dB | 1 |
|   |   |   | 111.112 | -40dB |   |
|   |   |   | 111.121 | -70dB |   |
|   |   |   | 111.123 | -80dB |   |
| N | AM 11.13 | 30/25 | 111.131 | -50dB | 1 |
|   |   |   | 111.122 | -40dB |   |
|   |   |   | 111.133 | -70dB |   |
|   |   |   | 111.111 | -100dB |   |

FIG. 13

| GROUP | TIME | LOCATION(LATITUDE /LONGITUDE) | MAC ADDRESS | RSSI | cell ID |
|---|---|---|---|---|---|
| 1 | AM 9.10 | 12/15 | 111.111 | -50dB | 1 |
|   |   |   | 111.112 | -40dB |   |
|   |   |   | 111.113 | -70dB |   |
|   |   |   | 111.114 | -100dB |   |
| 2 | AM 9.13 | 13/15 | 111.117 | -50dB | 1 |
|   |   |   | 111.112 | -40dB |   |
|   |   |   | 111.118 | -70dB |   |
|   |   |   | 111.119 | -100dB |   |
| 4 | AM 9.17 | 15/17 | 111.121 | -50dB | 1 |
|   |   |   | 111.112 | -80dB |   |
|   |   |   | 111.127 | -70dB |   |
|   |   |   | 111.129 | -70dB |   |
| ⋮ | ⋮ | ⋮ | ⋮ | ⋮ | ⋮ |
| N-1 | AM 11.11 | 20/21 | 111.125 | -60dB | 1 |
|   |   |   | 111.112 | -40dB |   |
|   |   |   | 111.121 | -70dB |   |
|   |   |   | 111.123 | -80dB |   |
| N | AM 11.13 | 30/25 | 111.131 | -50dB | 1 |
|   |   |   | 111.122 | -40dB |   |
|   |   |   | 111.133 | -70dB |   |
|   |   |   | 111.111 | -100dB |   |

FIG. 14

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -40dB | |
| | | | 111.118 | -70dB | |
| | | | 111.119 | -100dB | |
| ⋮ | ⋮ | ⋮ | ⋮ | ⋮ | ⋮ |
| N-1 | AM 11.11 | 20/21 | 111.125 | -60dB | 1 |
| | | | 111.112 | -40dB | |
| | | | 111.121 | -70dB | |
| | | | 111.123 | -80dB | |

| LOCATION(LATITUDE/LONGITUDE) | MAC ADDRESS | RSSI |
|---|---|---|
| 12/15 | 111.111 | −50dB |
| 13/15 | 111.117 | −50dB |
| 20/21 | 111.125 | −60dB |
| 12/15 | 111.113 | −70dB |
| 13/15 | 111.118 | −70dB |
| ⋮ | ⋮ | ⋮ |
| 20/21 | 111.121 | −70dB |
| 20/21 | 111.123 | −80dB |
| 12/15 | 111.114 | −100dB |
| 13/15 | 111.119 | −100dB |

FIG. 17

| GROUP | TIME | LOCATION(LATITUDE /LONGITUDE) | MAC ADDRESS | RSSI | cell ID |
|---|---|---|---|---|---|
| 1 | AM 9.10 | 12/15 | 111.111 | −50dB | 1 |
| | | | 111.112 | −40dB | |
| | | | 111.113 | −70dB | |
| | | | 111.114 | −100dB | |
| 2 | AM 9.13 | 13/15 | 111.117 | −50dB | 1 |
| | | | 111.112 | −40dB | |
| | | | 111.118 | −70dB | |
| | | | 111.119 | −100dB | |
| 3 | AM 9.15 | 14/15 | 111.121 | −40dB | 2 |
| | | | 111.122 | −80dB | |
| | | | 111.111 | −90dB | |
| | | | 111.114 | −100dB | |
| 4 | AM 9.17 | 15/17 | 111.121 | −50dB | 1 |
| | | | 111.112 | −80dB | |
| | | | 111.127 | −70dB | |
| | | | 111.129 | −70dB | |
| ⋮ | ⋮ | ⋮ | ⋮ | ⋮ | ⋮ |
| N−1 | AM 11.11 | 20/21 | 111.125 | −60dB | 1 |
| | | | 111.112 | −40dB | |
| | | | 111.121 | −70dB | |
| | | | 111.123 | −80dB | |
| N | AM 11.13 | 30/25 | 111.131 | −50dB | 1 |
| | | | 111.122 | −40dB | |
| | | | 111.133 | −70dB | |
| | | | 111.111 | −100dB | |

1710  1730  1750  1770  1790

(a)

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
|   |   |   | 111.112 | -40dB |   |
|   |   |   | 111.113 | -70dB |   |
|   |   |   | 111.114 | -100dB |   |
| 2 | AM 9.13 | 13/15 | 111.117 | -50dB | 1 |
|   |   |   | 111.112 | -40dB |   |
|   |   |   | 111.118 | -70dB |   |
|   |   |   | 111.119 | -100dB |   |
| 4 | AM 9.17 | 15/17 | 111.121 | -50dB | 1 |
|   |   |   | 111.112 | -80dB |   |
|   |   |   | 111.127 | -70dB |   |
|   |   |   | 111.129 | -70dB |   |
| ⋮ | ⋮ | ⋮ | ⋮ | ⋮ | ⋮ |
| N-1 | AM 11.11 | 20/21 | 111.125 | -60dB | 1 |
|   |   |   | 111.112 | -40dB |   |
|   |   |   | 111.121 | -70dB |   |
|   |   |   | 111.123 | -80dB |   |
| N | AM 11.13 | 30/25 | 111.131 | -50dB | 1 |
|   |   |   | 111.122 | -40dB |   |
|   |   |   | 111.133 | -70dB |   |
|   |   |   | 111.111 | -100dB |   |

(b)

| LOCATION(LATITUDE/LONGITUDE) | MAC ADDRESS | RSSI |
|---|---|---|
| 12/15 | 111.112 | -40dB |
| 13/15 | 111.112 | -40dB |
| 15/17 | 111.112 | -80dB |
| ⋮ | ⋮ | ⋮ |
| 20/21 | 111.112 | -40dB |

(c)

| CATEGORY | LOCATION(LATITUDE/LONGITUDE) | MAC ADDRESS | RSSI |
|---|---|---|---|
| 1 | 12/15 | 111.112 | -40dB |
|   | 13/15 | 111.112 | -40dB |
|   | ⋮ | ⋮ | ⋮ |
| 2 | 18/16 | 111.112 | -60dB |
|   | 18/17 | 111.112 | -70dB |
|   | ⋮ | ⋮ | ⋮ |
| 3 | 15/17 | 111.112 | -80dB |
|   | 16/16 | 111.112 | -90dB |
|   | ⋮ | ⋮ | ⋮ |

(a)

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| N-1 | AM 11.11 | 20/21 | 111.113 | -60dB | 1 |
| | | | 111.112 | -60dB | |
| | | | 111.118 | -70dB | |
| | | | 111.117 | -80dB | |

(b)

| GROUP | TIME | LOCATION(LATITUDE/LONGITUDE) | MAC ADDRESS | RSSI |
|---|---|---|---|---|
| 1 | AM 9.10 | 12/15 | 111.112 | -40dB |
| 2 | AM 9.13 | 13/15 | 111.112 | -50dB |
| N-1 | AM 11.11 | 20/21 | 111.112 | -60dB |
| 4 | AM 9.17 | 15/17 | 111.112 | -80dB |

(a)

(b)

LOCATION MEASURING METHOD AND APPARATUS USING ACCESS POINT FOR WIRELESS LOCAL AREA NETWORK SERVICE

BACKGROUND

1. Field

Exemplary embodiments relate to a technique for measuring a location of a communication terminal, and more particularly, to a location measuring method and apparatus using an access point for local area communications.

2. Description of the Related Art

With the development of mobile communication techniques, studies have been actively made on a location measuring technique that measures a location of a mobile terminal in a communication network. Typically, the use of a global positioning system (GPS)-based location measuring technique using satellites has been widespread.

The GPS-based location measuring technique has a disadvantage of having to mount a GPS receiver on a mobile terminal. Also, because the GPS-based location measuring technique was developed by the U.S. Department of Defense for military use, a high-precision GPS-based location measuring technique is not disclosed. Furthermore, the GPS-based location measuring technique has limited use since it is less useful in buildings, for example, houses, offices, or shops, where satellite signals are weak. To overcome these drawbacks, attempts have been made to measure a location using an access point for a wireless local area network (wireless LAN or WLAN) service.

The WLAN service enables mobile users to use the wireless Internet by connecting to a WLAN access point within a short-range area with user terminals, for example, notebook computers, personal digital assistants (PDAs), smart phones, and the like, that have WLAN cards mounted therein. Recently, to meet the increasing demand for the WLAN service, installation of access points in buildings, such as large-scaled shopping malls, and the like, has been increasing.

Since many access points have been installed in buildings, by using these access points, a location of a mobile terminal can be measured in buildings where a GPS-based location measuring technique can not be applied.

Accordingly, research and development on a location measuring technique using an access point for a WLAN service has recently been flourishing.

SUMMARY

The exemplary embodiments are directed to providing a location measuring method and apparatus for measuring a location of a communication terminal using an access point for a WLAN service.

Additional features of the invention will be set forth in the following description, and in part will be even more apparent from the examples set forth, or may be learned by practice of the invention.

According to an aspect of an exemplary embodiment, there is provided a method for measuring a location of a communication terminal using an access point according to an exemplary embodiment may include storing access point information collected at each location, extracting information of nearby access points collected together at a location, where information of a reference access point is collected, from the access point information, calculating a barycentric coordinate using the extracted location coordinates of the nearby access points, and determining the calculated barycentric coordinate as a final location of the communication terminal.

The extracting of the location measuring method may comprise extracting collection location coordinates of the reference access point from the access point information, calculating a barycentric coordinate using the extracted collection location coordinates, detecting a collection location coordinate located at a predetermined distance or more away from the calculated barycentric coordinate, and removing information of a nearby access point collected together at the detected collection location coordinate.

Alternatively, the extracting of the location measuring method may comprise (a) extracting collection location coordinates of the reference access point from the access point information, (b) selecting a predetermined number of collection location coordinates from the extracted collection location coordinates, (c) calculating a barycentric coordinate using the selected collection location coordinates and detecting a collection location coordinate located at a predetermined distance or more away from the barycentric coordinate, (d) repetitively performing the operations (b) and (c) on all the collection location coordinates extracted in the operation (a) in sequence, and (e) removing information of a nearby access point collected together at the collection location coordinate detected in the operations (c) and (d).

The calculating operation of the location measuring method may comprise (a) grouping the extracted information of the nearby access points and calculating a barycentric coordinate of each group, (b) grouping the calculated barycentric coordinates and calculating a barycentric coordinate of each group, and (c) repeating the operation (b) to obtain one final barycentric coordinate.

According to another aspect of an exemplary embodiment, there is provided an apparatus for measuring a location of a communication terminal using access point information according to an exemplary embodiment may include a storage means to store access point information collected at each location, an extracting means to extract information of nearby access points collected together at a location, where information of a reference access point is collected, from the access point information stored in the storage means, and a calculating means to calculate a barycentric coordinate using the location coordinates of the nearby access points extracted by the extracting means, and to determine the calculated barycentric coordinate as a final location of the communication terminal.

The location measuring apparatus may further include a removing means to extract collection location coordinates of the reference access point from the access point information, to calculate a barycentric coordinate using the extracted collection location coordinates, and to remove information of a nearby access point collected together at a collection location coordinate located at a predetermined distance or more away from the barycentric coordinate.

Alternatively, the location measuring apparatus may further include a removing means to repetitively perform a process on all the collection location coordinates of the reference access point in sequence, the process comprising selecting a predetermined number of collection location coordinates from the collection location coordinates of the reference access point among the access point information, calculating a barycentric coordinate using the selected collection location coordinates, and detecting a collection location coordinate located at a predetermined distance or more away from the barycentric coordinate, and to remove information of a nearby access point collected together at the detected collection location coordinate.

The calculating means of the location measuring apparatus may group the location coordinates of the nearby access points extracted by the extracting means and calculate a barycentric coordinate of each group, and may group the calculated barycentric coordinates and calculate a barycentric coordinate of each group in a repetitive manner to obtain one final barycentric coordinate.

In an exemplary embodiment, there is a method for measuring a location of a communication terminal using a plurality of access points, the method including: storing access point information collected at a plurality of locations; extracting information of nearby access points collected together at a location of the plurality of locations, where information of a reference access point is collected, from the access point information; calculating a barycentric coordinate using location coordinates of the nearby access points; and determining the calculated barycentric coordinate as a final location of the communication terminal.

In another exemplary embodiment, there is A method for measuring a location of a communication terminal using an access point, the method including: storing access point information collected at a plurality of locations; extracting information of a reference access point from the access point information; classifying collection location coordinates among the extracted information of the reference access point into a plurality of categories; calculating barycentric coordinates using the collection location coordinates of the plurality of categories; and determining a final barycentric coordinate based on the calculated barycentric coordinates, as a final location of the communication terminal.

In yet another exemplary embodiment, there is an apparatus for measuring a location of a communication terminal using access point information, the apparatus including: a storage unit which stores access point information collected at a plurality of locations; an extracting unit which extracts information of nearby access points collected together at a location of the plurality of locations, where information of a reference access point is collected, from the access point information stored in the storage unit; and a calculation unit which calculates a barycentric coordinate using location coordinates of the nearby access points extracted by the extracting unit, and determines the calculated barycentric coordinate as a final location of the communication terminal.

DESCRIPTION OF THE DRAWINGS

FIG. 4 is a table of access point information according to an exemplary embodiment.

FIGS. 6 to 8 are diagrams illustrating data extraction from an access point information database (DB) and data processing according to an exemplary embodiment.

FIG. 12 is a table of access point information stored in an access point information DB according to another exemplary embodiment.

FIGS. 13 to 15 are diagrams illustrating data extraction from an access point information DB and data processing according to another exemplary embodiment.

FIG. 16 is a block diagram illustrating a structure of a location measuring server according to another exemplary embodiment.

FIG. 17 is a table of access point information according to still another exemplary embodiment.

Figure 1:
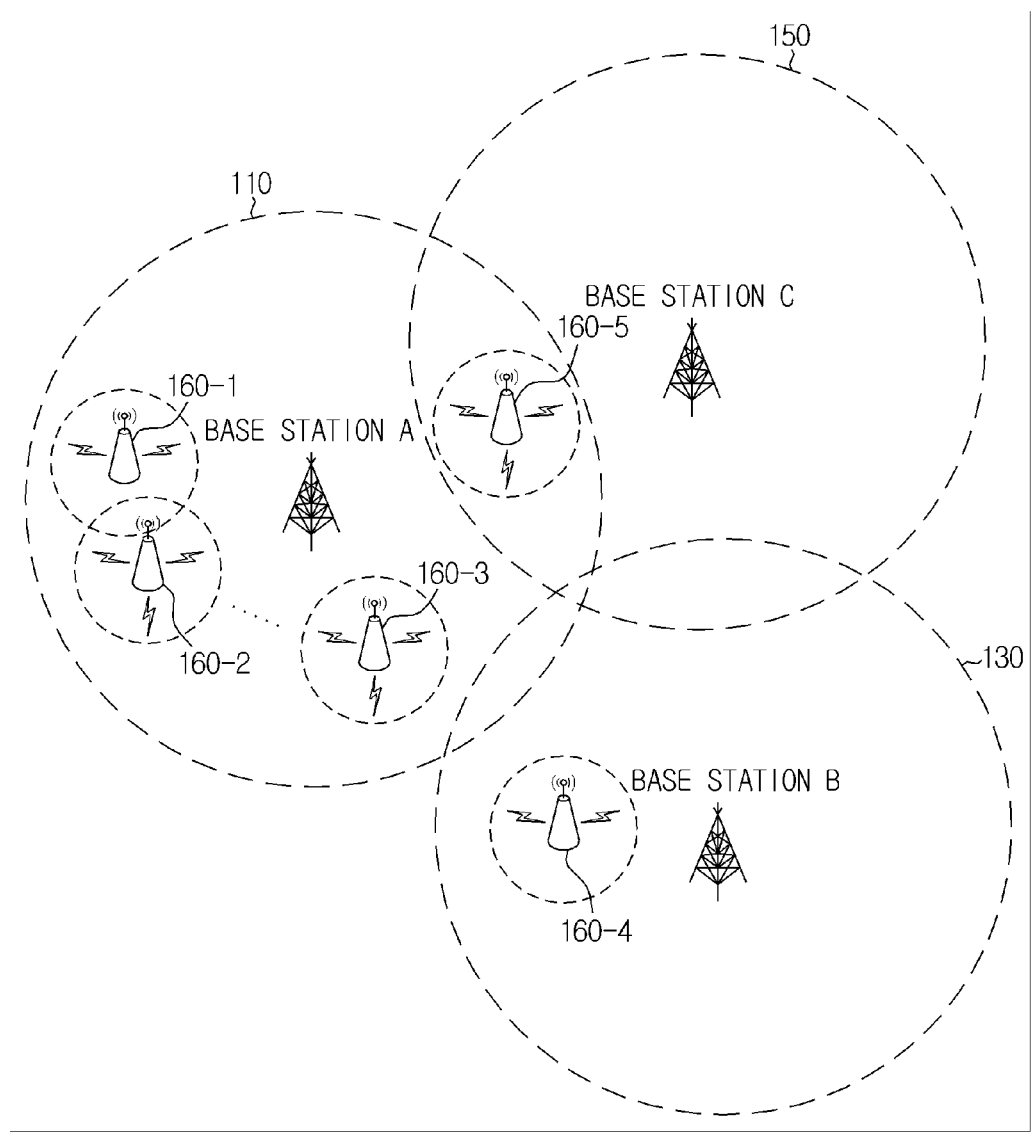
FIG. 1 is a diagram illustrating a communication environment according to an exemplary embodiment.

Throughout the drawings and detailed descriptions, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating a communication environment according to an exemplary embodiment.

Referring to FIG. 1, the communication environment includes base stations (A, B, and C) that provide a mobile communication service, and access points (APs 160-1, 160-2, 160-3, 160-4, and 160-5) that provide an Internet service using a WLAN system, for example, Wireless Fidelity (WiFi), in an overlapping arrangement. A communication terminal may use various services including voice communication and wireless Internet services via the base station when the communication terminal is mobile. Also, the communication terminal may use an Internet service by connecting to a wired Internet network via the access point.

Generally, the base station has coverage of several kilometers to tens of kilometers in radius, while the access point providing a WLAN service has coverage of only several meters or more in radius. Due to the low costs for purchasing and installing the access points, they are installed in large numbers at various places such as houses, offices, shopping malls, and the like.

As shown in FIG. 1, a plurality of access points 160-1, ..., 160-5 are placed within the coverages 110, 130, and 150 of base stations A, B, and C. Mobile terminal users use an Internet service via the access point 160-1, ..., 160-5 at locations where a signal from the access point 160-1, ..., 160-5 is detected. Also, where a signal from the access point 160-1, ..., 160-5 is not detected, the mobile terminal users use an Internet service via a base station.

Recently, with the advancement of smart phone functions, the number of smart phone users is increasing. To provide a high-speed Internet service to smart phones, the number of access points installed is also increasing. As many access points are particularly installed in places with a large floating population, the use of the access points in location measurement is increasing. The accuracy of location measurement using an access point with a narrow coverage is higher than that of a base station with a wide coverage.

Figure 2:
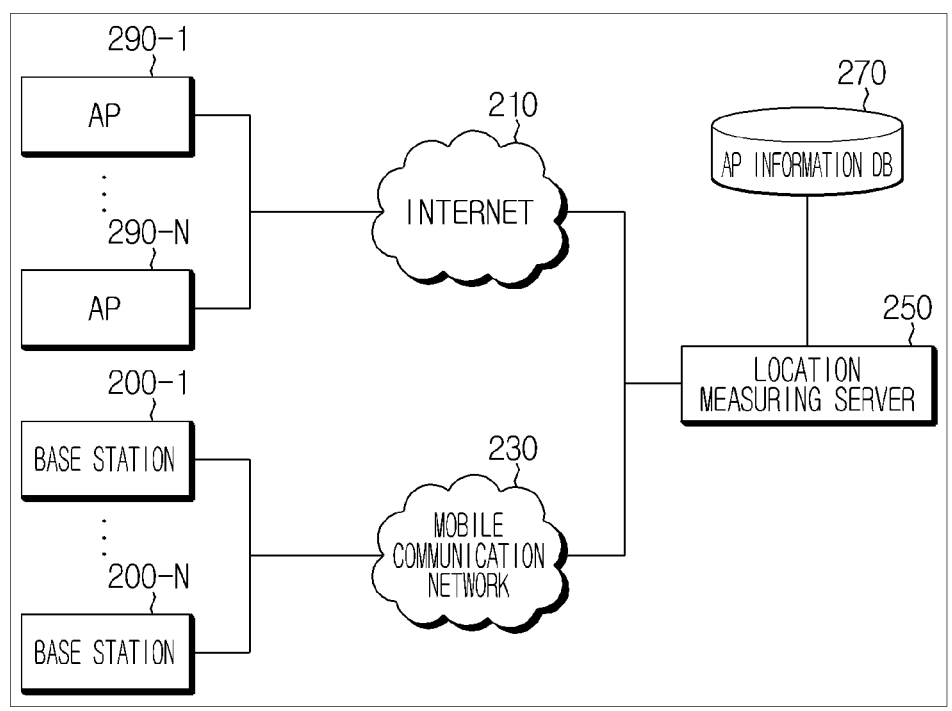
FIG. 2 is a block diagram illustrating a network structure of a location measuring system according to an exemplary embodiment.

FIG. 2 is a block diagram illustrating a network structure of a location measuring system according to an exemplary embodiment.

Referring to FIG. 2, access points 290-1, ..., 290-N providing a WLAN service and base stations 200-1, ..., 200-N providing a mobile communication service are installed at various locations. As shown in FIG. 1, coverage of the access points 290-1, ..., 290-N and coverage of the base stations 200-1, ..., 200-N may overlap. A plurality of access points may be placed within one base station because the base station has a wider coverage than the access point.

The access points 290-1, ..., 290-N are connected to a wired Internet network 210 to provide an Internet service. The base stations 200-1, ..., 200-N are connected to a mobile communication network 230 to provide a mobile communication service. The wired Internet network 210 and the mobile communication network 230 are linked to each other. Referring to FIG. 2, the location measuring system includes a location measuring server 250 connected to the wired Internet network 210 and the mobile communication network 230, and an access point information DB 270 managed by the location measuring server 250.

The access point information DB 270 stores identity information (for example, Media Access Control (MAC) address, Service Set Identifier (SSID), and the like) of access points installed indoors or outdoors and location coordinate information where the access points are actually installed. Also, the access point information DB 270 stores access point information at various locations by an access point information collecting terminal while the access point information collecting terminal is mobile, i.e., while the access point information collecting terminal is at various locations. The access point information includes collection location information collected by the access point information collecting terminal at a predetermined time cycle while the access point information collecting terminal is mobile, identity information and signal strength of access points detected at the collection location, and identity information of base stations. Its detailed description will follow later on.

When the location measuring server 250 is requested to measure a location of a specific communication terminal, the location measuring server 250 measures a location of the communication terminal using identity information of a base station of base stations 200-1, ..., 200-N where the communication terminal is placed and identity information of an access point of the access points 290-1, ..., 290-N to which the communication terminal is connected. A location measuring method of the location measuring server 250 is described in detail below.

Figure 3:
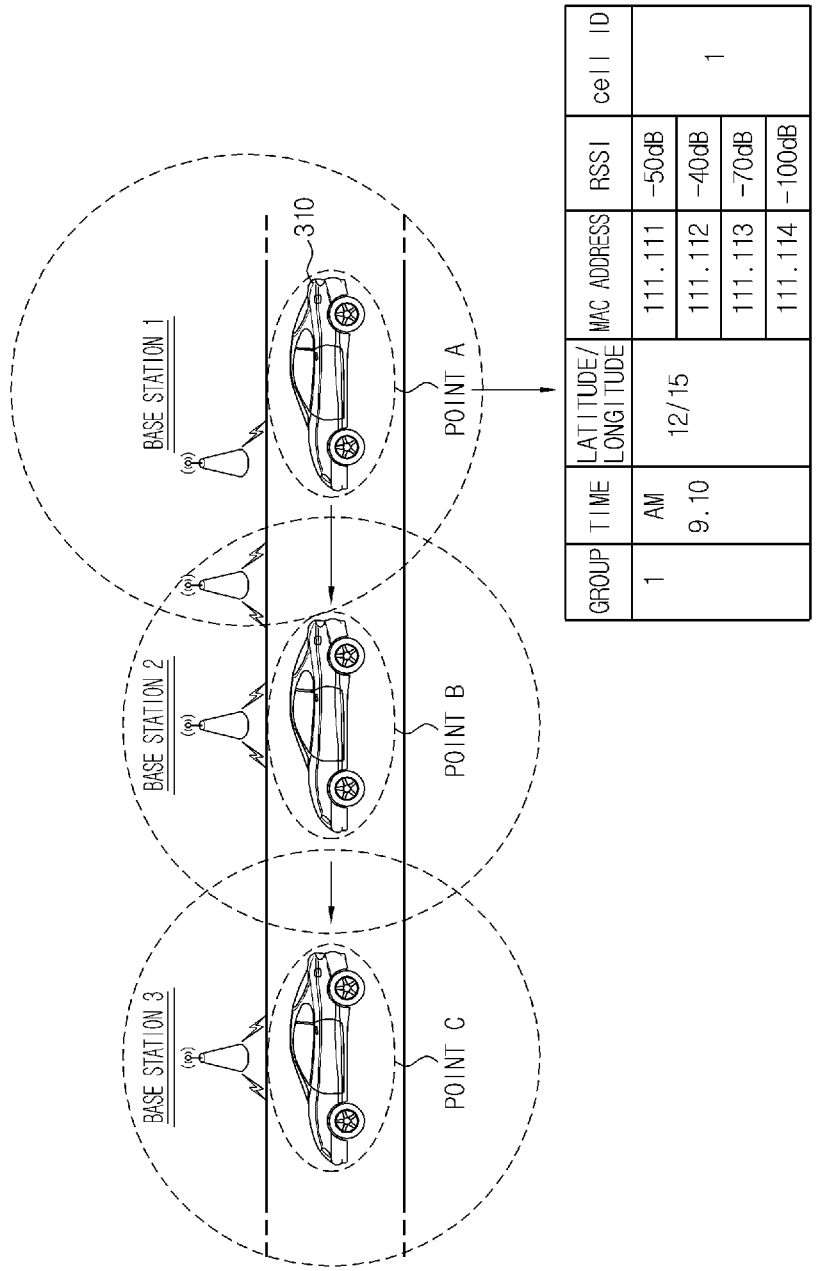
FIG. 3 is a diagram illustrating the collection of access point information according to an exemplary embodiment.

FIG. 3 is a diagram illustrating the collection of access point information according to an exemplary embodiment.

As shown in FIG. 3, an access point information collecting terminal mounted in a vehicle 310 collects information by detecting signals from nearby access points at a predetermined time cycle while the vehicle 310 is moving at a low speed. The information collected by the access point information collecting terminal includes collection time, collection location information (for example, latitude and longitude), identity information (for example, MAC address) and signal strength (for example, RSSI (Received Signal Strength Indication)) of an access point which transmits a signal detected at a collection location, and identity information (cell ID or Pseudo Noise (PN) code) of a base station which covers the corresponding collection location.

Referring to FIG. 3, and taking point A as an example, the access point information collecting terminal mounted in the vehicle 310 collects information of an access point which transmits a signal detected at point A. The access point information collecting terminal collects latitude and longitude information of point A, collection time, MAC address and signal strength (RSSI) of an access point which transmits a signal detected at point A, and identity information of a base station which covers the point A. As described above, the access point information collecting terminal collects access point information at every point at a predetermined time cycle (for example, every minute) while moving at low speed.

FIG. 4 is a table of access point information according to an exemplary embodiment. As described above with reference to FIG. 3, the access point information collecting terminal collects information of nearby access points at a predetermined time cycle while moving, and the collected access point information is shown in FIG. 4. As shown in FIG. 4, the table has a time field 410, a location field 430, a MAC address filed 450, an RSSI field 470, and a cell ID field 490.

The time field 410 records the time when the access point information collecting terminal collects information of a nearby access point. The location field 430 records collection location information (latitude and longitude information). The MAC address filed 450 records a MAC address of a nearby access point detected at a collection location. The RSSI field 470 records the signal strength from a nearby access point detected at a collection location. The cell ID field 490 records a cell ID of a base station covering a collection location. Although FIG. 4 shows only one cell ID for a base station being recorded, a plurality of cell IDs detected at the cell boundary may be recorded.

Figure 5:
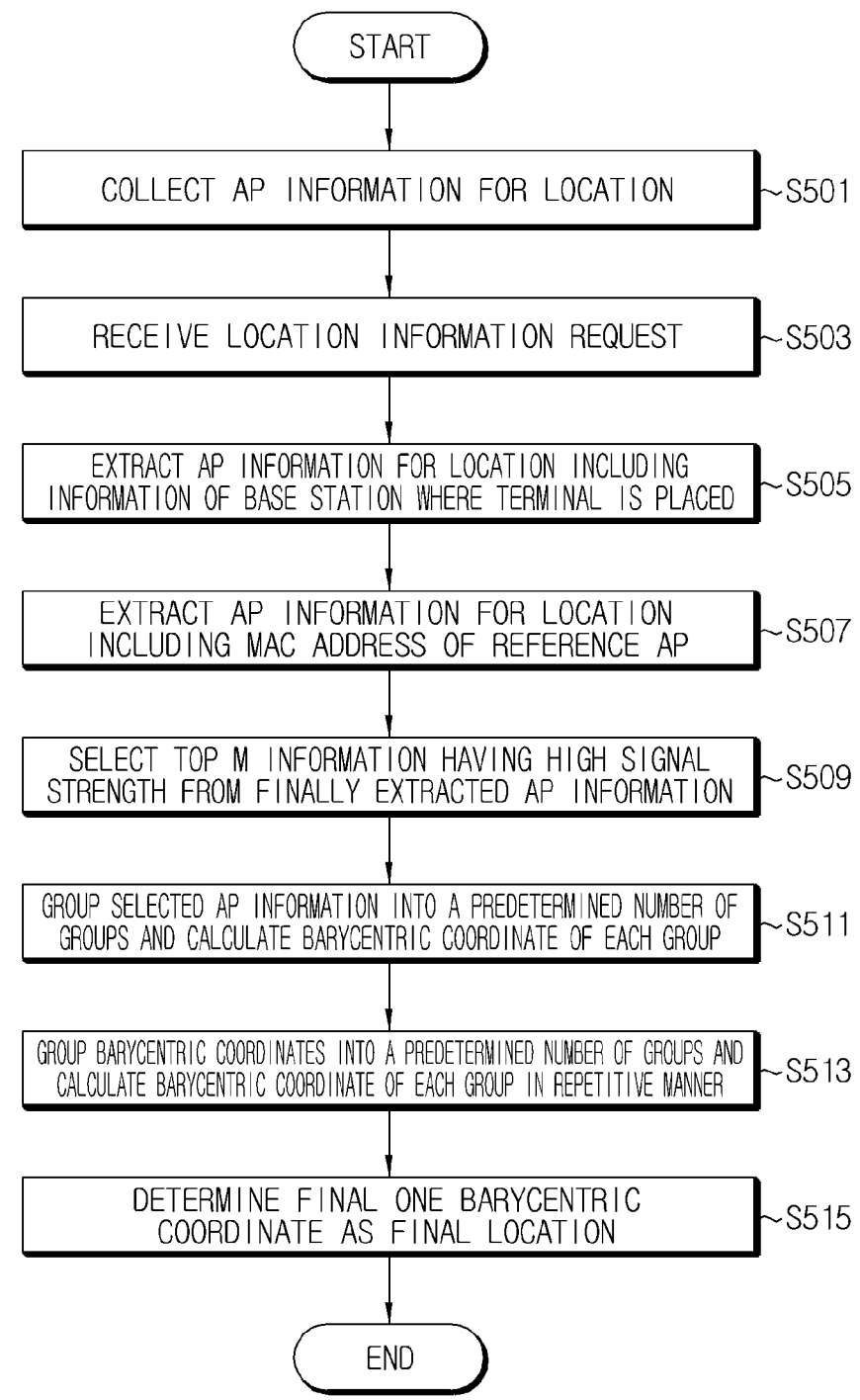
FIG. 5 is a flowchart illustrating a location measuring method performed by a location measuring server according to an exemplary embodiment.

FIG. 5 is a flowchart illustrating a location measuring method performed by the location measuring server 250 according to an exemplary embodiment. FIGS. 6 to 8 are diagrams illustrating data extraction from the access point information DB 270 and data processing according to an exemplary embodiment.

Referring to FIG. 5, the access point information collecting terminal collects information by detecting a signal from a nearby access point at a predetermined time cycle while moving at low speed, as described above with reference to FIGS. 3 and 4 (S501). The access point information collected by the access point information collecting terminal may be transmitted to the location measuring server 250 via the Internet network 210 or the mobile communication network 230. The location measuring server 250 stores the received access point information in the access point information DB 270. Alternatively, the access point information collected by the access point information collecting terminal may be stored in the access point information DB 270 by an operator.

After the access point information is collected, the location measuring server 250 receives a location measurement request for a specific communication terminal (S503). In this instance, the location measuring server 250 receives, from the specific communication terminal, identity information (for example, cell ID or PN code) of a base station covering an area where the specific communication terminal is placed, and identity information (for example, MAC address or SSID) of an access point which transmits a signal detected by the specific communication terminal.

The location measuring server 250 controls the specific communication terminal to transmit the identity information of the base station and the identity information of the access point using the identity information of the specific communication terminal. The specific communication terminal may transmit identity information and signal strength of a plurality of access points. Among a plurality of the received signals, the location measuring server 250 may select an access point which transmits a signal of the highest signal strength, or may select an arbitrary access point. Hereinafter, the selected access point is defined as a reference access point.

After the location measuring server 250 receives the location measurement request, the location measuring server 250 extracts access point information including the identity information of the base station covering an area, where the specific communication terminal is placed, from the access point information DB 270 using the identity information of the base station received together with the location measurement request (S505).

Specifically, the access point information DB 270 stores a table of access point information as shown in FIG. 4, and the location measuring server 250 extracts access point information including the identity information of the corresponding base station from the table. For example, when the identity information of the base station is cell ID '1', the location measuring server 250 extracts only access point information including cell ID '1' from the table of FIG. 4. FIG. 6 shows an example of access point information including cell ID '1', extracted from the table of FIG. 4.

Next, the location measuring server 250 further extracts only access point information including identity information (here, MAC address) of the reference access point from the access point information extracted in S505 (S507).

Specifically, when a MAC address of the reference access point accessible by the specific communication terminal is '111.112', the location measuring server 250 extracts only access point information including MAC address '111.112' from the access point information of FIG. 6, as shown in FIG. 7.

Next, the location measuring server 250 arranges access point information without the information of the reference access point among the access point information extracted in S507, in a descending order of signal strength (for example, RSSI), and selects the top M access point information (S509). That is, the location measuring server 250 selects only an access point adjacent to the reference access point accessible by the specific communication terminal. Here, M is preferably, but not necessarily, $K^n$ where K is a natural number of 3 or more and n is a natural number of 1 or more. FIG. 8 shows an example of the top M access point information having a high signal strength among access point information excluding the reference access point information (information corresponding to MAC address 111.112) in the access point information of FIG. 7.

Next, the location measuring server 250 groups the selected M access point information into groups, each group composed of randomly selected N access point information (N is a natural number of 3 or more, and is preferably, but not necessarily, equal to K), and calculates a barycentric coordinate of each group using collection location coordinates (for example, latitude and longitude) among access point information in each group (S511).

Figure 9:
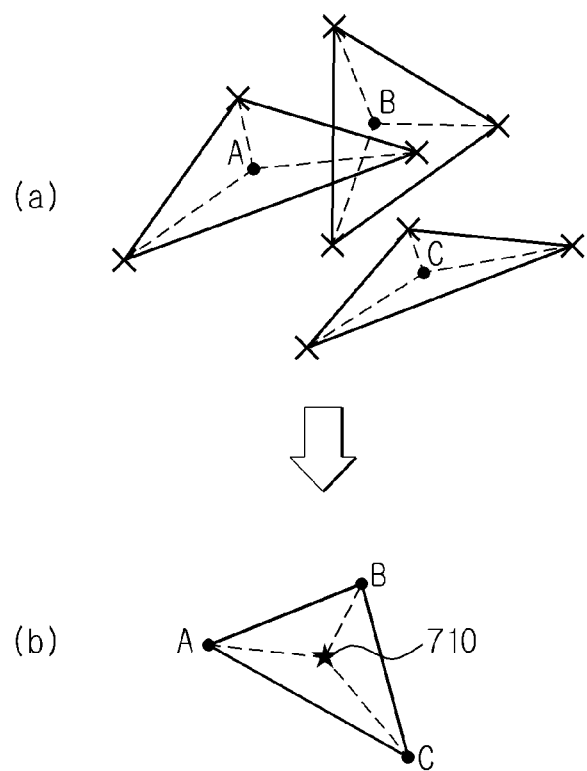
FIG. 9 is a diagram illustrating the calculation of a location coordinate of a communication terminal according to an exemplary embodiment.

Specifically, the detailed description is made with reference to FIG. 9. FIG. 9 is a diagram illustrating the calculation of a location coordinate of the communication terminal according to an exemplary embodiment. In this embodiment, M is 9 and N is 3. In S509, the top nine access point information having high RSSI is selected. In S511, the selected nine access point information are grouped into three groups, in which three access point information are randomly selected in each group. As shown in (a) of FIG. 9, a barycentric coordinate of a triangle having the apices of collection location coordinates of three access point information in each group is calculated. In (a) of FIG. 9, each of 'A', 'B', and 'C' is a barycentric coordinate of a respective group.

Next, after the barycentric coordinates are calculated as described above, the location measuring server 250 groups the calculated barycentric coordinates into groups, in which N barycentric coordinates are randomly selected in each group, and re-calculates a barycentric coordinate of each group. This process is repeated until one barycentric coordinate is obtained (S513).

Specifically, the barycentric coordinates obtained in FIG. 9 are 'A', 'B', and 'C'. Because three barycentric coordinates are sufficient to form a group, a barycentric coordinate of a triangle having the three barycentric coordinates as the apices is calculated. As shown in (b) of FIG. 9, one barycentric coordinate 710 is obtained.

Finally, the location measuring server 250 determines one final barycentric coordinate 710 obtained by the barycentric method as a final location of the specific communication terminal (S515). The location measuring server 250 transmits coordinate information of the determined final location to an object that has requested location information (for example, a mobile terminal, a web server, and the like). The coordinate information of the determined final location may be provided in the form of a map, or may be provided by transforming into an address corresponding to the coordinate. The form of location information to be provided is not limited.

This embodiment was described based on that M is $K^n$. This is because a polygon (for example, a triangle) of the same pattern is used to calculate a barycentric coordinate in S511 and S513 when N is set to equal K. However, M does not need to equal $K^n$. In S511 and S513 for calculating a barycentric coordinate by grouping, when a number X (N<X<2× N) of barycentric coordinates remain at the end, a final barycentric coordinate may be obtained by forming a polygon having the number X (N<X<2×N) of barycentric coordinates as the apices. Alternatively, when the barycentric coordinates are grouped into groups in which each group is composed of a predetermined number of barycentric coordinates, the number of barycentric coordinates in each group may not be equal.

Although this embodiment shows that in S505, access point information is extracted using identity information (that is, cell ID) of a base station covering an area where a communication terminal to be measured for its location is placed, this operation may not be necessary. The access point information including identity information (for example, MAC address) of a reference access point may be extracted by performing S507 alone without S505. In this case, because access point information for all locations should be searched, a location measuring rate may be reduced. Conversely, performing S505 may eliminate the need to search access point information for all locations, which will improve the location measuring rate.

Also, although the embodiment of FIG. 5 shows that a barycentric coordinate is calculated using collection location coordinates among access point information, the access point information DB 270 may store real location coordinates of access points as well as access point information depending on embodiments, and accordingly, the location measuring server 250 may check a real location coordinate of each access point using the MAC addresses of the selected M access points, and may calculate a barycentric coordinate using the real location coordinates.

Figure 10:
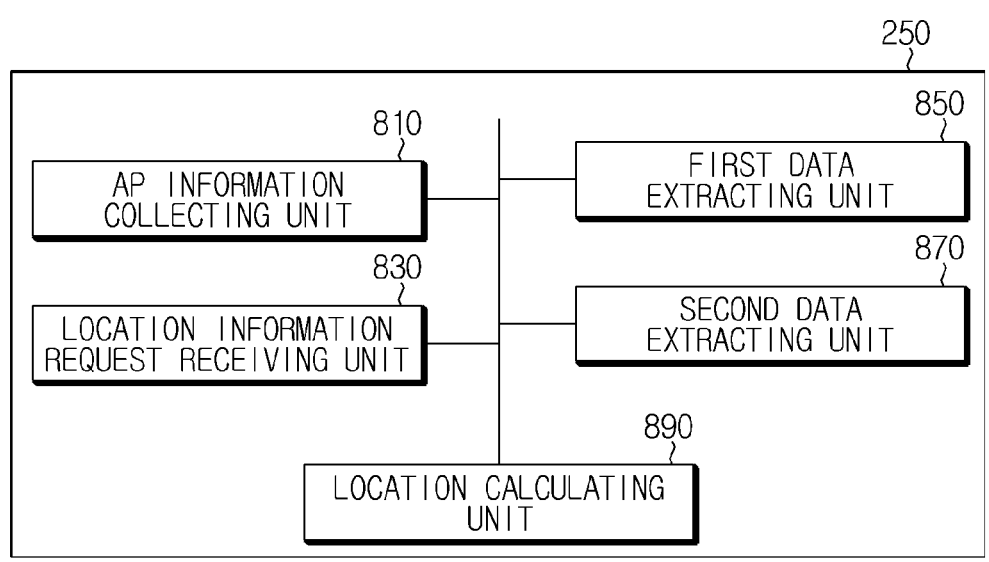
FIG. 10 is a block diagram illustrating a structure of a location measuring server according to an exemplary embodiment.

FIG. 10 is a block diagram illustrating a structure of the location measuring server 250 according to an exemplary embodiment.

Referring to FIG. 10, the location measuring server 250 according to an exemplary embodiment includes an access point information collecting unit 810, a location information request receiving unit 830, a first data extracting unit 850, a second data extracting unit 870, and a location calculating unit 890.

The access point information collecting unit 810 receives access point information collected by the access point information collecting terminal at a predetermined time cycle, and stores the access point information in the access point information DB 270. The access point information collecting unit 810 may directly receive access point information from the access point information collecting terminal via the Internet network 210 or the mobile communication network 230. An example of the access point information is shown in FIG. 4.

The location information request receiving unit 830 receives a location measurement request for a specific communication terminal. The location measurement request may be received from another communication network equipment by the request of another communication terminal. When the location information request receiving unit 830 receives the location measurement request, the location information request receiving unit 830 controls the specific communication terminal so as to receive, from the specific communication terminal, identity information (for example, cell ID or PN code) of a base station covering an area where the specific communication terminal is placed, and identity information (for example, MAC address or SSID) of a reference access point accessible by the specific communication terminal.

The first data extracting unit 850 extracts, from the access point information DB 270, access point information including the identity information of the base station covering an area where the specific communication terminal is placed, using the identity information of the base station received from the location information request receiving unit 830. For example, the access point information DB 270 stores a table of access point information as shown in FIG. 4, and when the identity information of the base station is cell ID '1', the first data extracting unit 850 extracts only access point information including cell ID '1' from the table. FIG. 6 shows an example of access point information including cell ID '1' extracted from the table of FIG. 4.

The second data extracting unit 870 extracts, from the access point information extracted by the first data extracting unit 850, access point information including the identity information of the reference access point accessible by the specific communication terminal that is received from the location information request receiving unit 830. For example, when the access point information extracted by the first data extracting unit 850 is as shown in FIG. 6 and a MAC address of the reference access point accessed by the specific communication terminal is '111.112', access point information including MAC address '111.112' is as shown in FIG. 7. That is, the second data extracting unit 870 extracts access point information collected together when information of the reference access point is collected.

The location calculating unit 890 arranges access point information excluding the information of the reference access point among the access point information extracted by the second data extracting unit 870, based on signal strength, and selects the top M access point information having a high signal strength.

Specifically, the location calculating unit 890 selects the top M access point information having a high signal strength (for example, RSSI) among the access point information extracted by the second data extracting unit 870. In this instance, the information of the reference access point is excluded. Here, M is preferably, but not necessarily, $K^n$ (K is a natural number of 3 or more, and n is a natural number of 1 or more). However, M does not need to equal $K^n$ as described above.

Also, the location calculating unit 890 groups the selected M access point information into a predetermined number of groups, in which N (N is a natural number of 3 or more, and is preferably, but not necessarily, equal to K) access point information are randomly selected in each group, and calculates a barycentric coordinate of each group using collection location coordinates among the access point information.

Also, the location calculating unit 890 groups the calculated barycentric coordinates into a predetermined number of groups, in which N barycentric coordinates are randomly selected in each group, and re-calculates a barycentric coordinate of each group. The location calculating unit 890 repeats this process until one barycentric coordinate is obtained, and determines the obtained one barycentric coordinate as a final location of the specific communication terminal.

When the location calculating unit 890 calculates a barycentric coordinate by grouping barycentric coordinates into groups, each group composed of N barycentric coordinates, if a number X (N<X<2×N) of barycentric coordinates remain at the end, the location calculating unit 890 may calculate one final barycentric coordinate by forming a polygon having the number X (N<X<2×N) of barycentric coordinates as the apices.

Also, when the location calculating unit 890 calculates a barycentric coordinate, the location calculating unit 890 may calculate one final barycentric coordinate by grouping barycentric coordinates into groups, in which the number of barycentric coordinates in each group is not equal.

Also, the location calculating unit 890 may calculate a barycentric coordinate using real location coordinates of access points rather than collection location coordinates of access points among access point information. The access point information DB 270 may store real location coordinates of access points as well as access point information, and the location calculating unit 890 may check a real location coordinate of each access point using identity information (for example, MAC address) among the selected M access point information, and may calculate a barycentric coordinate using the real location coordinates.

Figure 11:
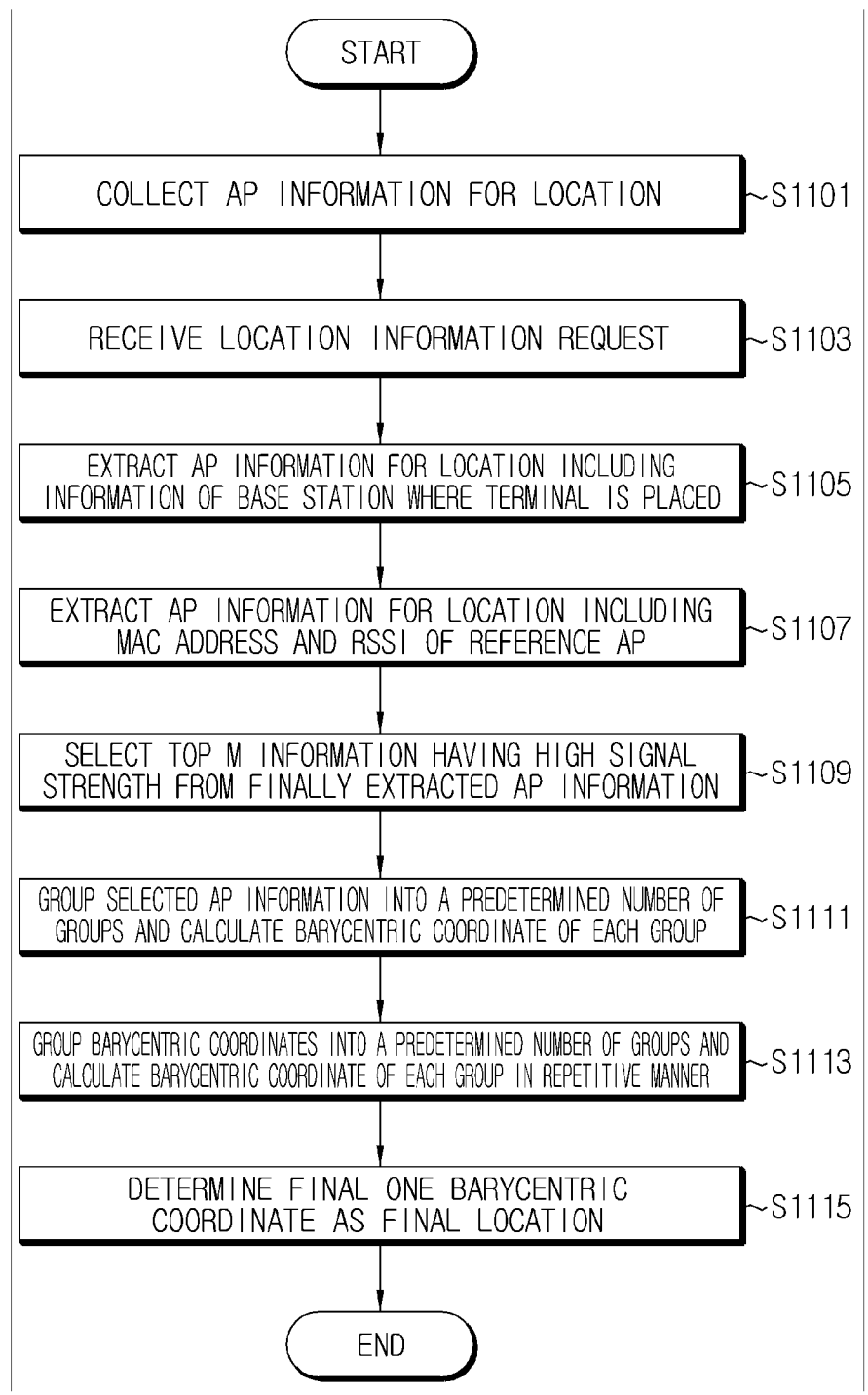
FIG. 11 is a flowchart illustrating a location measuring method performed by a location measuring server according to another exemplary embodiment.
Figures 15, 16:
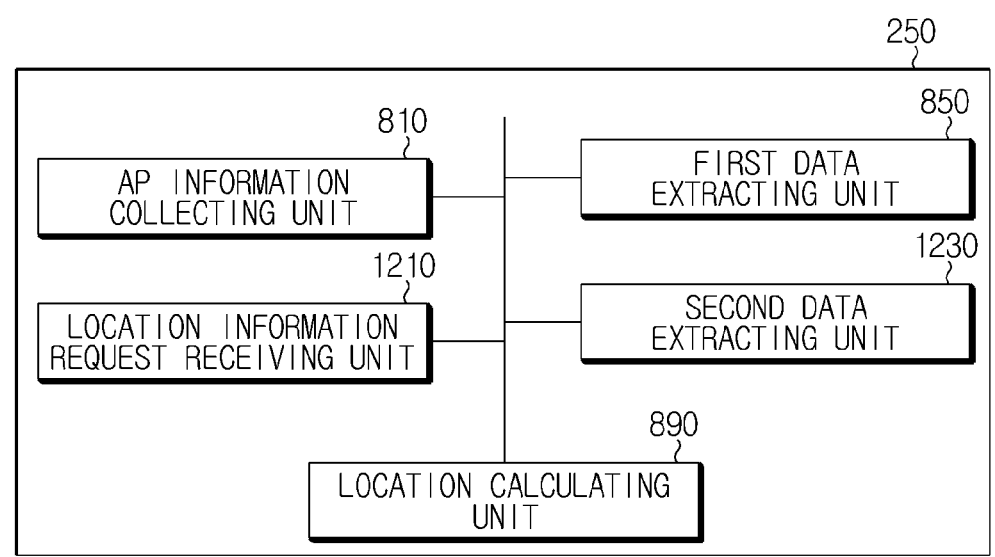

FIG. 11 is a flowchart illustrating a location measuring method performed by the location measuring server 250 according to another exemplary embodiment. FIG. 12 is a table of access point information stored in the access point information DB 270 according to another exemplary embodiment. FIGS. 13 to 15 are diagrams illustrating data extraction from the access point information DB 270 and data processing according to another exemplary embodiment. Hereinafter, the detailed description is made with reference to FIGS. 11 to 15.

Referring to FIG. 11, the access point information collecting terminal collects information of nearby access points at a predetermined time cycle while moving at low speed, as shown in FIGS. 3 and 4 (S1101). The access point information collected by the access point information collecting terminal may be transmitted to the location measuring server 250 via the Internet network 210 or the mobile communication network 230. The location measuring server 250 stores the received access point information in the access point information DB 270. Alternatively, the access point information collected by the access point information collecting terminal may be stored in the access point information DB 270 by an operator. An example of the access point information stored in the access point information DB 270 is shown in FIG. 12.

After the access point information is collected as described above, the location measuring server 250 receives a location measurement request for a specific communication terminal (S1103). The location measuring server 250 controls the specific communication terminal, so as to receive identity information (for example, cell ID or PN code) of a base station covering an area where the specific communication terminal is currently placed, and identity information (for example, MAC address or SSID) of a reference access point accessible by the specific communication terminal, together with signal strength information (for example, RSSI) of the reference access point. In this instance, the location measuring server 250 may receive information of a plurality of access points from the specific communication terminal, and the location measuring server 250 may determine an access point having the highest signal strength as a reference access point.

After the location measuring server 250 receives the location measurement request, the location measuring server 250 extracts, from the access point information DB 270, access point information including the identity information of the base station covering an area where the specific communication terminal is placed, using the identity information of the base station received together with the location measurement request (S1105).

Specifically, the access point information DB 270 stores a table of access point information as shown in FIG. 12, and the location measuring server 250 extracts access point information including the identity information of the corresponding base station from the table. For example, when the identity information of the base station is cell ID '1', the location measuring server 250 extracts only access point information including cell ID '1' from the table of FIG. 12. FIG. 13 shows an example of access point information including cell ID '1', extracted from the table of FIG. 12.

Next, the location measuring server 250 further extracts, from the access point information extracted in S1105, only access point information including the identity information (here, MAC address) of the reference access point and the signal strength information of the reference access point (S1107).

Specifically, when a MAC address of the reference access point is '111.112' and the signal strength of the reference access point is −40 dB, the location measuring server 250 extracts only access point information including MAC address of '111.112' and the signal strength of −40 dB from the access point information of FIG. 13, as shown in FIG. 14. FIG. 14 shows an example of access point information including MAC address of '111.112' and the signal strength of −40 dB, extracted from the access point information of FIG. 13.

Next, the location measuring server 250 selects the top M access point information having a high signal strength (for example, RSSI) among the access point information extracted in S1107 (S1109). In this instance, when the location measuring server 250 selects the top M access point information having high RSSI, the information of the reference access point is excluded, as shown in FIG. 15. That is, the location measuring server 250 selects only information of an access point adjacent to the reference access point. Here, M is preferably, but not necessarily, $K^n$ where K is a natural number of 3 or more and n is a natural number of 1 or more.

Next, the location measuring server 250 groups the selected M access point information into a predetermined number of groups, in which N (N is a natural number of 3 or more, and is preferably, but not necessarily, equal to K) access point information is randomly selected in each group, and calculates a barycentric coordinate of each group using collection location coordinates among the access point information (S1111).

Next, after the barycentric coordinates are calculated as described above, the location measuring server 250 groups the calculated barycentric coordinates into a predetermined number of groups, in which N barycentric coordinates are randomly selected in each group, and re-calculates a barycentric coordinate of each group. This process is repeated until one barycentric coordinate is obtained (S1113). The calculating of a barycentric coordinate in S1111 and S1113 is equal to that of the embodiment described with reference to FIG. 9.

Finally, the location measuring server 250 determines one final barycentric coordinate 710 obtained by the barycentric method as a final location of the specific communication terminal (S1115). The location measuring server 250 transmits coordinate information of the determined final location to an object that has requested location information (for example, a communication terminal, a web server, and the like). The coordinate information of the determined final location may be provided in the form of a map, or may be provided by transforming into an address corresponding to the coordinate. The form of location information to be provided is not limited.

The embodiment of FIG. 11 was described based on that M is $K^n$. This is because a polygon (for example, a triangle) of the same pattern is used to calculate a barycentric coordinate in S1111 and S1113 when N is set to equal K. However, M does not need to equal $K^n$. In S1111 and S1113 for calculating a barycentric coordinate by grouping, when a number X (N<X<2×N) of barycentric coordinates remain at the end, one final barycentric coordinate may be calculated by forming a polygon having the number X (N<X<2×N) of barycentric coordinates as the apices. Alternatively, when the barycentric coordinates are grouped into groups, the number of barycentric coordinates in each group may not be equal.

Although this embodiment shows that in S1105, access point information is extracted using identity information (that is, cell ID) of a base station covering an area where a communication terminal to be measured for its location is placed, this operation may not be necessary. The access point information including a MAC address of a reference access point may be extracted by performing S1107 alone without S1105. In this case, because access point information for all locations should be searched, a location measuring rate may be reduced. Conversely, performing S1105 may eliminate the need to search access point information for all locations, which will improve the location measuring rate.

Also, although the embodiment of FIG. 11 shows that a barycentric coordinate is calculated using collection location coordinates of access points, a barycentric coordinate may be calculated using real location coordinates of access points depending on embodiments. The access point information DB 270 may store real location coordinates of access points as well as access point information, and accordingly, the location measuring server 250 may check a real location coordinate of each access point using MAC addresses among the selected M access point information, and may calculate a barycentric coordinate using the real location coordinates.

According to the embodiment of FIG. 11, by extracting data using both identity information and signal strength information of the reference access point, the method according to the exemplary embodiment may accurately select information of access points installed in an area where a communication terminal to be measured for its location is actually placed, thereby improving the accuracy in location measurement.

FIG. 16 is a block diagram illustrating a structure of the location measuring server 250 according to another exemplary embodiment. In FIG. 16, the same reference numerals are regarded as indicating the elements having the same function and operation as those of FIG. 10, and the detailed description of the same elements is herein omitted and only the other elements are described.

Referring to FIG. 16, the location measuring server 250 includes a location information request receiving unit 1210 and a second data extracting unit 1230, unlike the embodiment of FIG. 10.

The location information request receiving unit 1210 receives a location measurement request for a specific communication terminal. When the location information request receiving unit 1210 receives the location measurement request, the location information request receiving unit 1210 controls the specific communication terminal, so as to receive identity information (for example, cell ID or PN code) of a base station covering an area where the specific communication terminal is currently placed, and identity information (for example, MAC address or SSID) of a reference access point accessible by the specific communication terminal, together with signal strength information (for example, RSSI) of the reference access point. In this instance, the location measuring server 250 may receive information of a plurality of access points from the specific communication terminal, and may determine an access point having the highest signal strength as a reference access point.

The second data extracting unit 1230 extracts, from the access point information extracted by the first data extracting unit 850, access point information including the identity information and the signal strength information of the reference access point that is received by the location information request receiving unit 1210. For example, when the access point information extracted by the first data extracting unit 850 is as shown in FIG. 13, and a MAC address of the reference access point is '111.112' and the signal strength of the reference access point is −40 dB, access point information including MAC address of '111.112' and signal strength of −40 dB is as shown in FIG. 14.

When compared with the location measuring server of FIG. 10, by extracting data using both identity information and signal strength information of the reference access point, the location measuring server of FIG. 16 may accurately select information of access points installed in an area where a communication terminal to be measured for its location is actually placed, thereby improving the accuracy of location measurement.

FIG. 17 is a table of access point information according to still another exemplary embodiment, and shows access point information collected by the access point information collecting terminal at a predetermined time cycle while the access point information collecting terminal is mobile, as described above with reference to FIG. 3. As shown in FIG. 17, the table includes a time field 1710, a location field 1730, a MAC address field 1750, an RSSI field 1770, and a cell ID field 1790.

Figure 18:
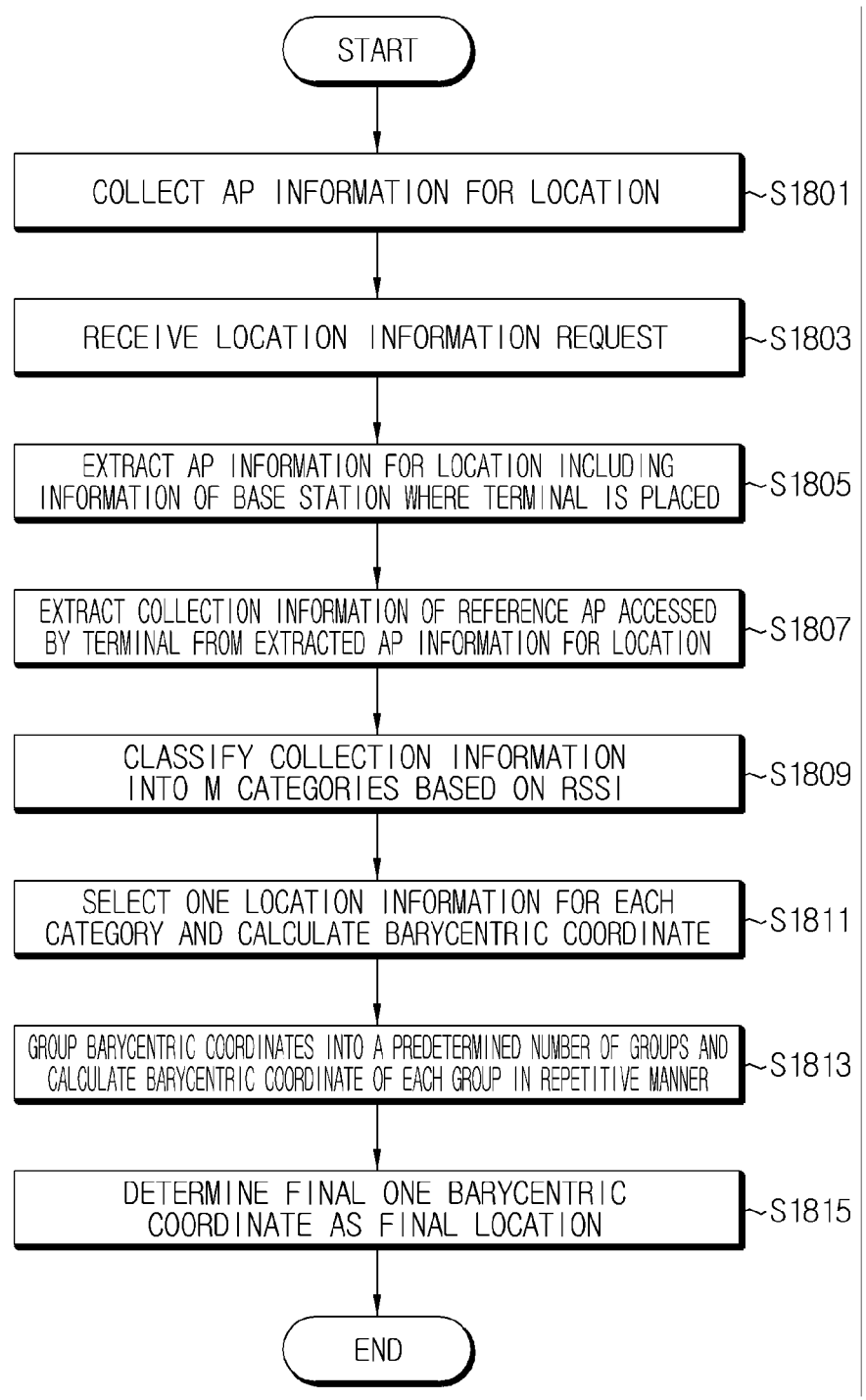
FIG. 18 is a flowchart illustrating a location measuring method performed by a location measuring server according to still another exemplary embodiment.
Figure 19:
FIG. 19 is a diagram illustrating data extraction from an access point information DB and data processing according to still another exemplary embodiment.
Figure 19:

FIG. 18 is a flowchart illustrating a location measuring method performed by the location measuring server 250 according to still another exemplary embodiment. FIG. 19 is a diagram illustrating data extraction from the access point information DB 270 and data processing according to still another exemplary embodiment.

Referring to FIG. 18, the access point information collecting terminal collects information of nearby access points at a predetermined time cycle while moving at low speed, as described above with reference to FIGS. 3 and 4 (S1801). The access point information collected by the access point information collecting terminal may be transmitted to the location measuring server 250 via the Internet network 210 or the mobile communication network 230. The location measuring server 250 stores the received access point information in the access point information DB 270. Alternatively, the access point information collected by the access point information collecting terminal may be stored in the access point information DB 270 by an operator.

After the access point information is collected as described above, the location measuring server 250 receives a location measurement request for a specific communication terminal (S1803). In this instance, the location measuring server 250 receives, from the specific communication terminal, identity information (for example, cell ID or PN code) of a base station covering an area where the specific communication terminal is placed, and identity information (for example, MAC address or SSID) of an access point which transmits a signal detected by the specific communication terminal.

The location measuring server 250 controls the specific communication terminal to transmit the identity information of the base station and the identity information of the access point using identity information of the specific communication terminal. The specific communication terminal may transmit identity information and signal strength of a plurality of access points, and among the received signals, the location measuring server 250 may select identity information of an access point which transmits a signal of the highest signal strength, or may select identity information of an arbitrary access point. Hereinafter, the selected access point is defined as a reference access point.

After the location measuring server 250 receives the location measurement request, the location measuring server 250 extracts, from the access point information DB 270, access point information including the identity information of the base station covering an area where the specific communication terminal is placed, using the identity information of the base station received together with the location measurement request (S1805).

Specifically, the access point information DB 270 stores a table of access point information as shown in FIG. 17, and the location measuring server 250 extracts access point information including the identity information of the corresponding base station from the table. For example, when the identity information of the base station is cell ID '1', the location measuring server 250 extracts only access point information including cell ID '1' from the table of FIG. 17. (a) of FIG. 19 shows an example of access point information including cell ID '1', extracted from the table of FIG. 17.

Next, the location measuring server 250 further extracts only collection information of the reference access point accessible by the specific communication terminal from the access point information extracted in S1805, using the identity information (here, MAC address) of the reference access point received together with the location measurement request (S1807).

Specifically, when a MAC address of the reference access point accessible by the specific communication terminal is '111.112', the location measuring server 250 extracts only collection information of the reference access point including MAC address '111.112' from the access point information of (a) of FIG. 19. (b) of FIG. 19 shows an example of collection information of the reference access point including MAC address '111.112', extracted from the access point information of (a) of FIG. 19.

Next, the location measuring server 250 classifies the collection information of the reference access point extracted in S1807 into M categories based on signal strength (for example, RSSI) (S1809). For example, collection information of the reference access point having RSSI between −40 dB and −50 dB (not including −50 dB) is classified into a first category, collection information of the reference access point having RSSI between −50 dB and −80 dB (not including −80 dB) is classified into a second category, and collection information of the reference access point having RSSI between −80 dB and −100 dB (not including −100 dB) is classified into a third category. (c) of FIG. 19 shows an example of the collection information of the reference access point extracted in S1807 and categorized as described above. When the collection information of the reference access point is classified into M categories, the number of collection information of the reference access point in each category may not be equal.

Here, M is preferably, but not necessarily, a natural number of 3 or more to form a polygon. When the collection information of the reference access point is classified into categories, a minimum number of collection information of the reference access point in each category is preferably, but not necessarily, set to be $K^n$ where K is a natural number of 3 or more and n is a natural number of 0 or more. This is to apply the barycentric method based on a polygon in a subsequent operation.

Next, the location measuring server 250 randomly selects one collection information of the reference access point in each category to form a predetermined number of groups, and calculates a barycentric coordinate of each group, using location information (here, location information is not a real location coordinate of the reference access point, but a location coordinate where the reference access point is collected, that is, a collection location coordinate recorded in access point information) among the collection information of the reference access point in each group (S1811). Although this embodiment shows one collection information of the reference access point in each category randomly selected to form a group, one collection information of the reference access point having the highest RSSI in each category may be selected to form a group. The selecting method is not limited to a specific scheme.

Figure 20:
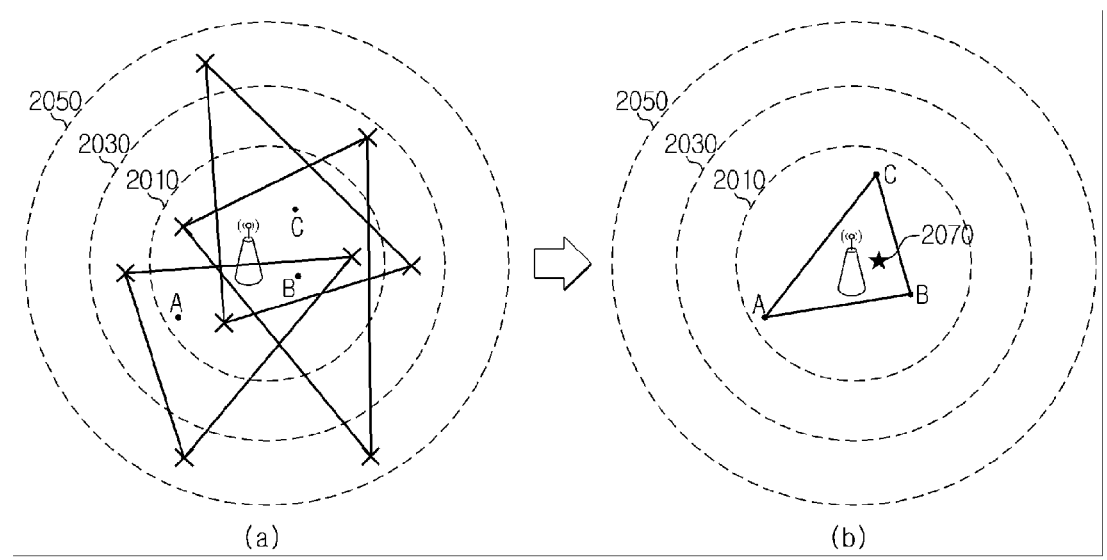
FIG. 20 is a diagram illustrating the calculation of a location coordinate of a communication terminal according to still another exemplary embodiment.

Specifically, the detailed description is made with reference to FIG. 20. FIG. 20 is a diagram illustrating the calculation of a location coordinate of a communication terminal according to still another exemplary embodiment. In this embodiment, there are three categories in which three collection information of the reference access point is included in each category. In FIG. 20, three concentric circles 2010, 2030, and 2050 in dotted lines representing the coverages correspond to three categories, respectively, and are arranged based on signal strength from the reference access point in the center. When one collection information of the reference access point in each category is selected to form a group, a total of three groups are formed. When a barycentric coordinate is calculated using collection location coordinates among the collection information of the reference access point of each group, three barycentric coordinates 'A', 'B', and 'C' are calculated as shown in (a) of FIG. 20.

In this instance, the number of collection information of the reference access point in each category may not be equal as described above. Accordingly, when the location measuring server 250 selects one collection information of the reference access point in each category to form a group, the number of groups is equal to a smallest number of collection information in the categories. For example, when five collection information is included in a first category, three collection information is included in a second category, and five collection information is included in a third category, three groups are formed in which each group is composed of one collection information selected in each category.

Next, after the barycentric coordinates are calculated as described above, the location measuring server 250 groups the calculated barycentric coordinates into a number of groups, in which N barycentric coordinates are randomly selected in each group, and re-calculates a barycentric coordinate of each group. This process is repeated until one barycentric coordinate is obtained (S1813).

Specifically, the calculated barycentric coordinates are 'A', 'B', and 'C' as shown in (a) of FIG. 20. Because three barycentric coordinates are sufficient to form a group, further grouping is not necessary. When a barycentric coordinate of a triangle having the apices of the three barycentric coordinates is calculated, one barycentric coordinate 2070 is obtained as shown in (b) of FIG. 20.

Here, N is preferably, but not necessarily, a natural number of 3 or more, however two barycentric coordinates may be obtained in S1813. In this case, a center of gravity of a straight line connecting the two barycentric coordinates becomes a barycentric coordinate.

In an exemplary embodiment, N may be equal to K. When N is K, a polygon (for example, a triangle) of the same pattern is used to calculate a barycentric coordinate in S1813. However, N does not need to equal K. In S1813 for calculating a barycentric coordinate by grouping, when a number X (N<X<2×N) of barycentric coordinates remain at the end, a final barycentric coordinate may be obtained by forming a polygon having the number X (N<X<2×N) of barycentric coordinates as the apices.

Also, in S1813 for selecting N barycentric coordinates to calculate a barycentric coordinate, N barycentric coordinates are not necessarily selected in each repetition and a variable number of barycentric coordinates may be selected.

Finally, the location measuring server 250 determines one final barycentric coordinate 710 obtained by the barycentric method as a final location of the specific communication terminal (S1815). The location measuring server 250 transmits coordinate information of the determined final location to an object that has requested location information (for example, a communication terminal, a web server, and the like). The coordinate information of the determined final location may be provided in the form of a map, or may be provided by transforming into an address corresponding to the coordinate. The form of location information to be provided is not limited.

Although this embodiment shows that in S1805, access point information is first extracted using identity information (that is, cell ID) of a base station covering an area where a communication terminal to be measured for its location is placed, this operation may not be necessary. By performing S1807 alone without performing S1805, collection information of a reference access point accessible by the communication terminal to be measured for its location may be extracted, using identity information (for example, MAC address) of the corresponding reference access point. In this case, because access point information for all locations should be searched, a location measuring rate may be reduced. Conversely, performing S1805 may eliminate the need to search access point information for all locations, which will improve the location measuring rate.

Figure 21:
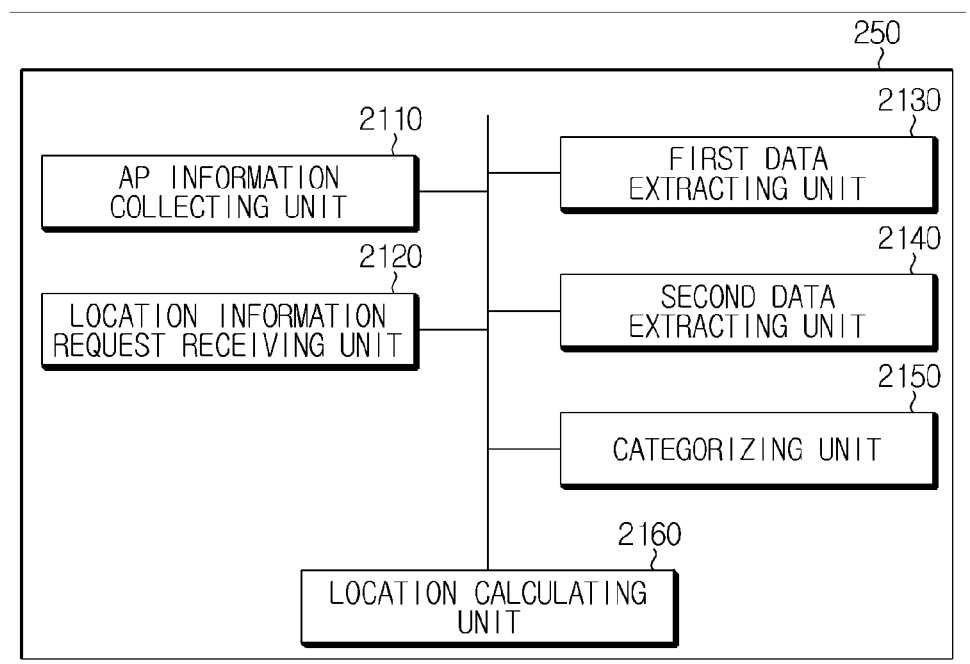
FIG. 21 is a block diagram illustrating a structure of a location measuring server according to still another exemplary embodiment.

FIG. 21 is a block diagram illustrating a structure of the location measuring server 250 according to still another exemplary embodiment.

Referring to FIG. 21, the location measuring server 250 according to still another embodiment exemplary includes an access point information collecting unit 2110, a location information request receiving unit 2120, a first data extracting unit 2130, a second data extracting unit 2140, a categorizing unit 2150, and a location calculating unit 2160.

The access point information collecting unit 2110 receives access point information collected at a predetermined time cycle by the access point information collecting terminal, and stores the access point information in the access point information DB 270. The access point information collecting unit 2110 may directly receive access point information from the access point information collecting terminal via the Internet network 210 or the mobile communication network 230. An example of the access point information is shown in FIG. 17.

The location information request receiving unit 2120 receives a location measurement request for a specific communication terminal. The location measurement request may be received from the specific communication terminal or from another communication network equipment by the request of another communication terminal. The location information request receiving unit 2120 receives identity information (for example, cell ID or PN code) of a base station covering an area where the specific communication terminal is placed, and identity information (for example, MAC address or SSID) of a reference access point accessible by the specific communication terminal from the specific communication terminal. Alternatively, the location information request receiving unit 2120 may receive information of a plurality of access points from the specific communication terminal, and may determine an access point having the highest signal strength as a reference access point.

The first data extracting unit 2130 extracts, from the access point information DB 270, access point information including the identity information of the base station covering an area where the specific communication terminal is placed, using the identity information of the base station received from the location information request receiving unit 2120. For example, the access point information DB 270 stores a table of access point information as shown in FIG. 17, and when the identity information of the base station is cell ID '1', the first data extracting unit 2130 extracts only access point information including cell ID '1' from the table of FIG. 17. (a) of FIG. 19 shows an example of access point information including cell ID '1' extracted from the table of FIG. 17.

The second data extracting unit 2140 extracts, from the access point information extracted by the first data extracting unit 2130, only collection information including the identity information of the reference access point using the identity information of the reference access point accessible by the specific communication terminal that is received from the location information request receiving unit 2120. For example, when a MAC address of the reference access point is '111.112', the second data extracting unit 2140 extracts collection information of the reference access point including MAC address '111.112' from the access point information. (b) of FIG. 19 shows an example of collection information of the reference access point including MAC address '111.112' extracted from the access point information of (a) of FIG. 19.

The categorizing unit 2150 classifies the collection information of the reference access point extracted by the second data extracting unit 2140 into M categories based on signal strength (for example, RSSI). For example, the categorizing unit 2150 classifies collection information of the reference access point having RSSI between −40 dB and −50 dB (not including −50 dB) into a first category, collection information of the reference access point having RSSI between −50 dB and −80 dB (not including −80 dB) into a second category, and collection information of the reference access point having RSSI between −80 dB and −100 dB ((not including −100 dB)) into a third category. (c) of FIG. 19 shows an example of the collection information of the reference access point extracted by the second data extracting unit 2140 and classified as described above.

When the categorizing unit 2150 classifies the collection information of the reference access point into M categories, the number of collection information of the reference access point in each category may not be equal. Here, M is preferably, but not necessarily, a natural number of 3 or more. When the collection information of the reference access point is classified into categories, a minimum number of collection information of the reference access point in each category is preferably, but not necessarily, set to be $K^n$ where K is a natural number of 3 or more and n is a natural number of 0 or more. This is to easily form a polygon when applying the barycentric method.

The location calculating unit 2160 randomly selects one collection information in each category classified by the categorizing unit 2150 to form a predetermined number of groups, and calculates a barycentric coordinate of each group using location information (here, location information is not a real location coordinate of the reference access point, but a location coordinate where information of the reference access point is collected, that is, a collection location coordinate recorded in access point information) among the collection information of the reference access point of each group (S1811). In this instance, instead of one collection information of the reference access point randomly selected in each category, one collection information of the reference access point having the highest RSSI in each category may be selected to form a group. The selecting method is not limited to a specific scheme.

Specifically, the detailed description is made with reference to FIG. 20. In FIG. 20, there are three categories classified by the categorizing unit 2150 in which three collection information of the reference access point is included in each category, and three concentric circles 2010, 2030, and 2050 in dotted lines representing the coverages correspond to three categories, respectively, and are arranged based on signal strength from the reference access point in the center. When one collection information of the reference access point in each category is selected to form a group, a total of three groups are formed. When a barycentric coordinate is calculated using a collection location coordinate among the collection information of the reference access point of each group, three barycentric coordinates 'A', 'B', and 'C' are calculated as shown in (a) of FIG. 20.

In this instance, the number of collection information in each category may not be equal as described above. Accordingly, when the location measuring server 2160 selects one collection information in each category to form a group, the number of groups is equal to a smallest number of collection information in the categories. For example, when five collection information is included in a first category, three collection information is included in a second category, and five collection information is included in a third category, three groups are formed in which each group is composed of one access point selected in each category.

Next, after the barycentric coordinates are calculated as described above, the location calculating unit 2160 groups the calculated barycentric coordinates into a predetermined number of groups, in which N barycentric coordinates are randomly selected in each group, and re-calculates a barycentric coordinate of each group. The location calculating unit 2160 repeats this process until one barycentric coordinate is obtained, and determines the obtained one barycentric coordinate as a final location of the specific communication terminal.

For example, the calculated barycentric coordinates are 'A', 'B', and 'C' in (a) of FIG. 20. Because three barycentric coordinates are sufficient to form a group, further grouping is not necessary. When a barycentric coordinate is calculated using a triangle having the three barycentric coordinates as the apices, one barycentric coordinate 2070 is obtained as shown in (b) of FIG. 20.

Although FIG. 21 shows that the location measuring server 250 includes the first data extracting unit 2130, the first data extracting unit 2130 may not be included. The second data extracting unit 2140 may directly extract collection information of a reference access point accessible by a communication terminal to be measured for its location, using identity information (for example, MAC address) of the reference access point. However, the use of the first data extracting unit 2130 eliminates the need for the second data extracting unit 2140 to search access point information for all locations, which will improve the location measuring rate.

Generally, each access point has unique identity information, however illegal copying of identity information of access points is recently increasing. Accordingly, an error occurs in location measurement for a communication terminal due to a plurality of access points having the same identity information. Also, with an increasing trend in mobile access points, mobile access points opposed to fixed access points, are mounted in vehicles or trains, and provide a wireless Internet service to the vehicles or trains while the vehicles or trains are mobile. Disadvantageously, the use of the mobile access points may increase an error in location measurement for a communication terminal.

For example, when there are two access points having the same identity information, collection information of the two access points may be simultaneously included in access point information stored in the access point information DB 270. In this instance, when a communication terminal to be measured for its location is connected to a first access point, only collection information of the first access point should be used in measuring a location of the communication terminal according to the exemplary embodiment. However, collection information of a second access point having the same identity information is also used in measuring a location of the communication terminal.

When the second access point is located at a distance away from the first access point, collection information of the second access point makes the measurement of a location coordinate of the communication terminal be closer to the second access point than the first access point, resulting in reduced accuracy in location measurement of the communication terminal. Accordingly, collection information of an access point having the same identity information but having a different location should be eliminated during a location measuring process. This is the case with collection information of mobile access points. When information of a mobile access point located at a distance is collected, there is a possibility that the accuracy in location measurement of a communication terminal could be reduced due to the collected information.

Figure 22:
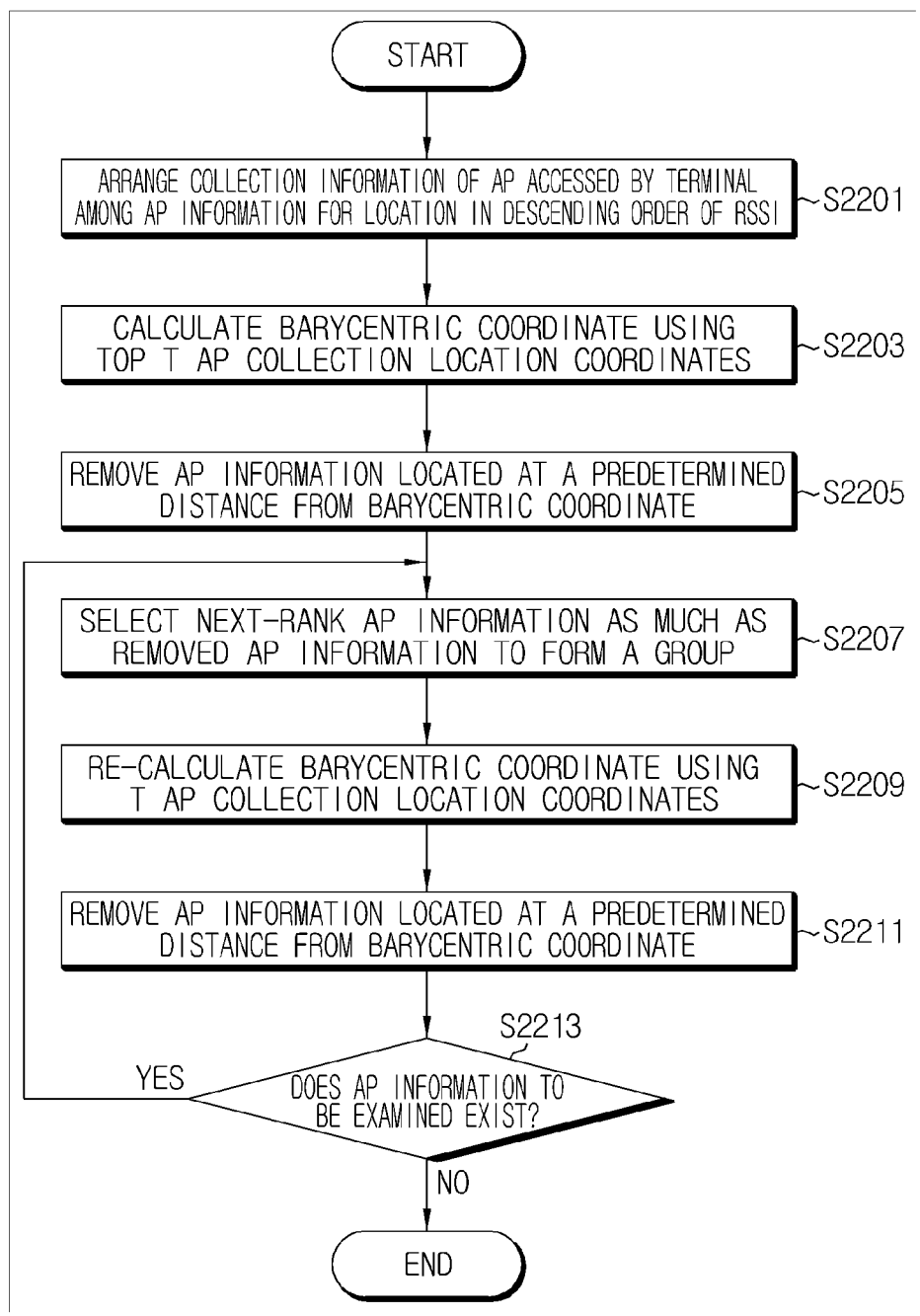
FIG. 22 is a flowchart illustrating a process for removing unnecessary collection information according to an exemplary embodiment.
Figure 23:
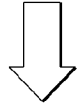
FIG. 23 is a diagram illustrating data processing to remove unnecessary collection information according to an exemplary embodiment.

FIG. 22 is a flowchart illustrating a process for removing unnecessary collection information according to an exemplary embodiment. FIG. 23 is a diagram illustrating data processing to remove unnecessary collection information according to an exemplary embodiment.

The process for removing unnecessary collection information described with reference to FIG. 22 may be performed between S507 and S509 in the location measuring method described with reference to FIG. 5. Also, the removing process may be performed between S1107 and S1109 in the location measuring method described with reference to FIG. 11. Also, the removing process may be performed between S1807 and S1809 in the location measuring method described with reference to FIG. 18.

Referring to FIG. 22, after the location measuring server 250 extracts access point information including information of a reference access point accessible by a communication terminal to be measured for its location in S507 or S1107, the location measuring server 250 selects the information of the reference access point from the extracted access point information and arranges the information in a descending order of signal strength (RSSI) (S2201). For example, when access point information including the information of the reference access point is as shown in (a) of FIG. 23, the information of the reference access point arranged in a descending order of signal strength (RSSI) is as shown in (b) of FIG. 23.

Next, the location measuring server 250 calculates a barycentric coordinate using collection location coordinates of the top T collection information among the information of the reference access point arranged in a descending order (S2203). Here, T is preferably, but not necessarily, a natural number of 3 or more. Also, the location measuring server 250 determines a collection location coordinate located at a predetermined distance or more away from the calculated barycentric coordinate to be removed, and removes access point information collected at the collection location coordinate (S2205).

Figure 24:
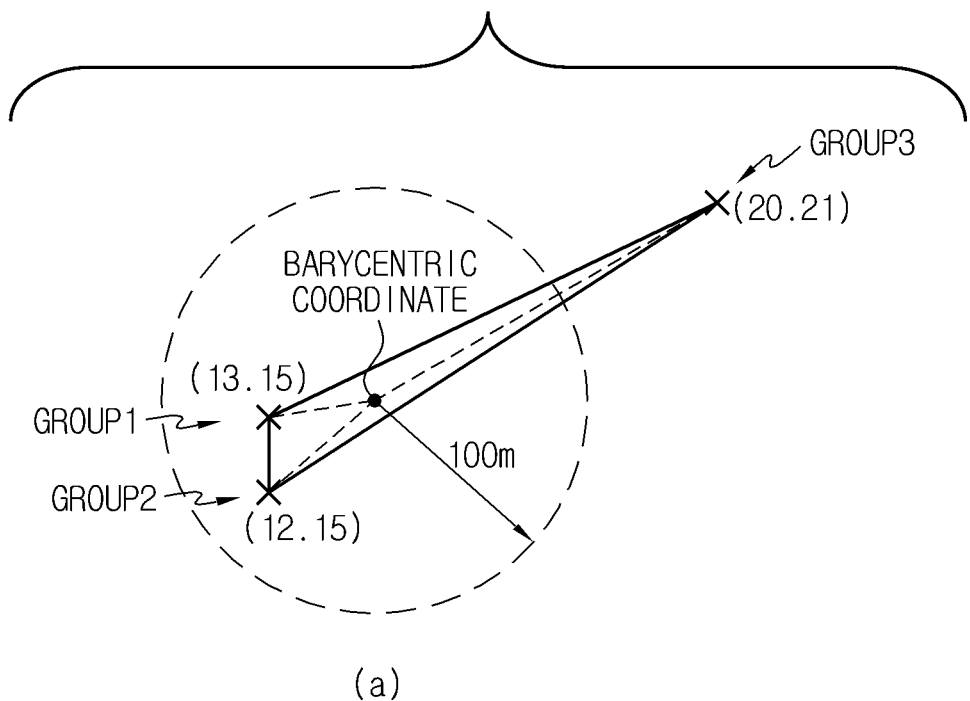
FIG. 24 is a diagram illustrating the calculation of a location coordinate to remove unnecessary collection information according to an exemplary embodiment.
Figure 24:
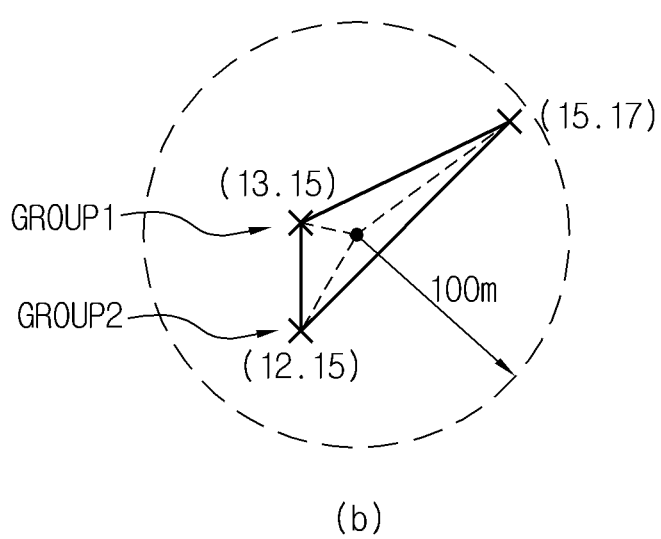

For example, when a barycentric coordinate is calculated using collection location coordinates of the top three collection information having a high signal strength among the information of the reference access point arranged as shown in (b) of FIG. 23, the calculated barycentric coordinate is as shown in (a) of FIG. 24. FIG. 24 is a diagram illustrating the calculation of a barycentric coordinate using collection location coordinates of an access point according to an exemplary embodiment. Referring to (a) of FIG. 24, three collection location coordinates are (12,15), (13,15), and (20,21), and a barycentric coordinate of a triangle having the apices of the collection location coordinates is calculated. A collection location coordinate located at a distance of at least 100 meters away from the calculated barycentric coordinate is (20,21), and information collected at the collection location coordinate (20,21) is information of an N−1 group among the access point information of (a) of FIG. 23. Accordingly, the information of the N−1 group should be removed from location measurement data to prevent an error in location measurement.

Next, the location measuring server 250 selects next-rank collection information as much as the number of the removed information, and puts together with collection information not removed in S2205 to form a group that is composed of T collection information (S2207). Also, the location measuring server 250 calculates a barycentric coordinate using collection location coordinates of the T collection information (S2209), and determines a collection location coordinate located at a predetermined distance or more away from the barycentric coordinate to be removed, and removes access point information collected at the collection location coordinate to prevent an error in location measurement (S2211).

For example, when the collection information of the N−1 group is removed from the collection information of (a) of FIG. 23, the location measuring server 250 re-calculates a barycentric coordinate using collection location coordinates of collection information of a next-rank group, that is, Group 4, and collection location coordinates of collection information of Group 1 and Group 2. (b) of FIG. 24 shows an example of the calculation of a barycentric coordinate using collection location coordinates of collection information of Group 1, Group 2, and Group 4.

After unnecessary collection information is removed as described above, the location measuring server 250 checks if there is collection information to be examined (S2213), and if any, the location measuring server 250 repeats the process from S2207 until collection information to be examined does not exist.

In the embodiment in which a barycentric coordinate is calculated using collection location coordinates of T collection information in a repetitive manner, when the number of collection information to be examined is not T×N (N is a natural number), collection location coordinates of T collection information may not be used at the end. For example, when checking access point information to be removed by calculating a barycentric coordinate using three collection location coordinates, if two next-rank collection information remains after one collection information is removed, access point information to be removed is checked by calculating a barycentric coordinate using four collection location coordinates rather than three collection location coordinates.

Although this embodiment shows that T collection information forms a group in each repetition, the number of collection information for forming a group in each repetition may not be equal.

Also, when next-rank collection information to be examined does not exist after access point information is removed in S2205, the process may end with S2205.

In the embodiment described with reference to FIG. 22, S2205 was described on the assumption that a collection location coordinate located at a predetermined distance or more away from a barycentric coordinate exists. However, a collection location coordinate located at a predetermined distance or more away from a barycentric coordinate may not exist. In this instance, S2207 comprises removing collection information having the lowest signal strength from the T collection information selected in S2205 and including collection information having the next higher signal strength to form a new group composed of T collection information.

That is, when a collection location coordinate located at a predetermined distance or more away from a barycentric coordinate exists, next-rank collection information is selected as much as the number of such collection location coordinates, however when a collection location coordinate located at a predetermined distance or more away from a barycentric coordinate does not exist, a group composed of T collection information may be formed by removing an arbitrary number of collection location coordinates having the lowest signal strength and including next-rank collection information in sequence.

The location measuring servers 250 of FIGS. 10, 16, and 21 each may further include an access point data removing unit. When access point information including the information of the reference access point is extracted by the second data extracting unit 870, 1230, or 2140, the access point data removing unit selects the information of the reference access point from the extracted access point information, arranges the information of the reference access point in a descending order of signal strength (RSSI), and calculates a barycentric coordinate using collection location coordinates of the top T collection information having a high signal strength (RSSI) among the information of the reference access point arranged in a descending order.

For example, when access point information including the information of the reference access point is as shown in (a) of FIG. 23, the access point data removing unit extracts only the information of the reference access point, and arranges the information of the reference access point in a descending order of signal strength (RSSI) as shown in (b) of FIG. 23. Also, when a barycentric coordinate is calculated using collection location coordinates of the top three collection information having a high signal strength among the information arranged as shown in (b) of FIG. 23, the calculated barycentric coordinate is as shown in (a) of FIG. 24. Referring to (a) of FIG. 24, collection location coordinates of three collection information are (12,15), (13,15), and (20,21), and a barycentric coordinate of a triangle having the apices of the three collection location coordinates is calculated.

The access point data removing unit determines a collection location coordinate located at a predetermined distance away from the calculated barycentric coordinate as a collection location coordinate to be removed, and removes access point information collected at the collection location coordinate from the access point information extracted by the second data extracting unit 870, 1230, or 2140. For example, a collection location coordinate located at a distance of 100 meters or more away from the barycentric coordinate is (20, 21) in (a) of FIG. 24, and information collected at the collection location coordinate (20,21) is collection information of an N−1 group among the collection information of (b) of FIG. 23. Accordingly, the collection information of the N−1 group is removed.

Also, the access point data removing unit selects next-rank collection information as much as the number of the removed collection information, puts together with collection information not removed to form a new group that is composed of T collection information, and re-calculates a barycentric coordinate using collection location coordinates of the T collection information. This process is repeated for all information of the reference access point.

For example, when information of an N−1 group is removed from the information of the reference access point arranged as shown in (b) of FIG. 23, a barycentric coordinate is re-calculated using collection location coordinates of collection information of a next-rank group, that is, Group 4, and collection location coordinates of collection information of Group 1 and Group 2. (b) of FIG. 24 shows an example of the calculation of a barycentric coordinate using collection location coordinates of access points of Group 1, Group 2, and Group 4.

In this embodiment, the access point data removing unit calculates a barycentric coordinate using collection location coordinates of T collection information, however when the number of collection information to be examined is not T×N (N is a natural number), collection location coordinates of T collection information may not be used at the end. Although this embodiment shows that T collection information is used to form a group in each repetition, the number of collection information for forming a group in each repetition may not be equal.

As described above, when measuring a location of a communication terminal using collection information of access points providing local area communications according to the exemplary embodiment, an error in location measurement may be reduced by removing unnecessary collection information (collection information of a mobile access point and the like), thereby improving the accuracy in location measurement. For example, when a communication terminal is connected to a first access point and a second access point is located at a distance away from the first access point, if collection information of the second access point is not removed, a location coordinate of the communication terminal may be measured closer to the second access point than the first access point. Accordingly, removal of the collection information of the second access point prevents an error in location measurement of the communication terminal, thereby improving the accuracy in location measurement for the communication terminal.

The access point described in the exemplary embodiment may be called a micro base station, a pico base station, a UbiCell base station, and the like, depending on the policies of manufacturers or communication providers. Accordingly, it should be understood that the access point of the exemplary embodiment is a gateway point capable of providing Internet service to a communication terminal via a common Internet line by directly communicating with the communication terminal via local area communication.

Also, it is obvious that the location measuring method of the exemplary embodiment may be applied indoors as well as outdoors. In this instance, while latitude and longitude coordinate is used as a collection location coordinate outdoors, an imaginary coordinate may be used as a collection location coordinate indoors. For example, after giving a coordinate to each floor of the building, setting imaginary coordinates on each floor, and collecting access point information at each location, the location measuring method of the exemplary embodiment may measure a location of a communication terminal using the barycentric method.

Also, the location measuring method of the exemplary embodiment may be applied to a child location monitoring service, a location tracking service of a vehicle parked indoors or outdoors, a customized ad service based on a location of a communication terminal, a criminal protective supervision service, and the like.

The method of the exemplary embodiment may be recorded in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single embodiment can also be implemented in multiple embodiments separately or in any suitable sub combination.

Although the drawings describe the operations in a specific order, it should not be interpreted that the operations are performed in a specific order as shown in the drawings or successively performed in a continuous order, or all the operations are performed to obtain a desired result. Multitasking or parallel processing may be advantageous under any environment. Also, it should be understood that all embodiments do not require the distinction of various system components made in this embodiment. The program components and system may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for measuring a location of a communication terminal using a plurality of access points, the method comprising:
    storing access point information collected at a plurality of locations by a collecting terminal;
    extracting information of access points collected together at a location of the plurality of locations, where information of a reference access point transmitted by the communication terminal is collected, from the access point information;
    calculating a barycentric coordinate using location coordinates of the access points extracted from the information of the access points; and
    determining the calculated barycentric coordinate as a final location of the communication terminal,
    wherein the access points comprise at least one wireless local area network device.

2. The method for measuring the location of the communication terminal according to claim 1,
    wherein the calculating comprises calculating the barycentric coordinate using collection location coordinates of the access points.

3. The method for measuring the location of the communication terminal according to claim 1,
    wherein the calculating comprises calculating the barycentric coordinate using installation location coordinates of the access points.

4. The method for measuring the location of the communication terminal according to claim 1,
    wherein the extracting comprises:
        extracting collection location coordinates of the reference access point from the access point information;
        calculating a barycentric coordinate using the extracted collection location coordinates;
        detecting a collection location coordinate located at a predetermined distance or more away from the calculated barycentric coordinate; and
        removing information of an access point collected together at the detected collection location coordinate.

5. The method for measuring the location of the communication terminal according to claim 1,
    wherein the extracting comprises:
        (a) extracting collection location coordinates of the reference access point from the access point information;
        (b) selecting a predetermined number of collection location coordinates from the extracted collection location coordinates;

(c) calculating a barycentric coordinate using the selected predetermined number of collection location coordinates, and detecting a collection location coordinate located at a predetermined distance or more away from the barycentric coordinate;

(d) repetitively performing the operations (b) and (c) on all the collection location coordinates extracted in the operation (a), in sequence; and (e) removing information of an access point collected together at the collection location coordinate detected in the operations (c) and (d).

6. The method for measuring the location of the communication terminal according to claim 5,
wherein the operation (d) comprises, in the selecting of the collection location coordinates, selecting a portion of the previously selected collection location coordinates and selecting collection location coordinates other than the previously selected collection location coordinates.

7. The method for measuring the location of the communication terminal according to claim 1,
wherein the calculating comprises:
(a) grouping the extracted information of the access points into a first group and calculating barycentric coordinates of the first group;
(b) grouping the calculated barycentric coordinates into a second group and calculating a barycentric coordinate of the second group; and
(c) repeating the operation (b) to obtain a final barycentric coordinate of a triangle having apices of the calculated barycentric coordinates grouped into the second group.

8. The method for measuring the location of the communication terminal according to claim 1,
wherein the extracting comprises extracting information of a set of top M access points of the access points based on signal strength information of the access points, and
wherein M is a natural number greater than or equal to two.

9. The method for measuring the location of the communication terminal according to claim 1,
wherein the extracting comprises extracting information of the set of top M access points of the access points based on signal strength information of the access points, and wherein M is equal to $K^n$ where K is a natural number of 3 or more and n is a natural number of 1 or more.

10. A method for measuring a location of a communication terminal using an access point, the method comprising:
storing access point information collected at a plurality of locations by a collecting terminal;
extracting information of a reference access point transmitted by the communication terminal from the access point information;
classifying collection location coordinates among the extracted information of the reference access point into a plurality of categories based on a received signal strength of the reference access point at the collection location coordinates;
calculating barycentric coordinates using the collection location coordinates of the plurality of categories; and
determining a final barycentric coordinate based on the calculated barycentric coordinates, as a final location of the communication terminal,
wherein the reference access point comprises at least one wireless local area network device.

11. The method for measuring the location of the communication terminal according to claim 10,
wherein the calculating comprises:
selecting one collection location coordinate for each of the plurality of categories to form a plurality of groups, and calculating a barycentric coordinate of each of the plurality of groups;
grouping calculated barycentric coordinates into a plurality of groups, and calculating a barycentric coordinate of each of the plurality of groups; and
repeating the grouping and the calculating to obtain a final barycentric coordinate.

12. An apparatus for measuring a location of a communication terminal using access point information, the apparatus comprising:
a storage unit which stores access point information collected at a plurality of locations by a collecting terminal;
an extracting unit which extracts information of access points collected together at a location of the plurality of locations, where information of a reference access point transmitted by the communication terminal is collected, from the access point information stored in the storage unit; and
a calculation unit which calculates a barycentric coordinate using location coordinates of the access points extracted by the extracting unit, and determines the calculated barycentric coordinate as a final location of the communication terminal,
wherein the access points comprise at least one wireless local area network device.

13. The apparatus for measuring the location of the communication terminal according to claim 12,
wherein the calculation unit calculates the barycentric coordinate using collection location coordinates of the access points.

14. The apparatus for measuring the location of the communication terminal according to claim 12,
wherein the calculation unit calculates the barycentric coordinate using installation location coordinates of the access points.

15. The apparatus for measuring a location of the communication terminal according to claim 12, further comprising:
a removing unit which extracts collection location coordinates of the reference access point from the access point information, calculates a barycentric coordinate using the extracted collection location coordinates, and removes information of an access point collected together at a collection location coordinate located at a predetermined distance or more away from the barycentric coordinate.

16. The apparatus for measuring the location of the communication terminal according to claim 15,
wherein the removing unit extracts the collection location coordinates of the reference access point based on signal strength information.

17. The apparatus for measuring the location of the communication terminal according to claim 12, further comprising:
a removing unit which repetitively performs a process on all the collection location coordinates of the reference access point in sequence, the process which selects a predetermined number of collection location coordinates of the reference access point from the access point information, calculates a barycentric coordinate using the selected collection location coordinates, and detects a collection location coordinate located at a predetermined distance or more away from the barycentric coordinate, and removes information of an access point collected together at the detected collection location coordinate.

18. The apparatus for measuring the location of the communication terminal according to claim 17,
wherein the removing unit selects a portion of the previously selected collection location coordinates, and selects collection location coordinates other than the previously selected collection location coordinates, during the repetitive performing of the process.

19. The apparatus for measuring the location of the communication terminal according to claim 12,
wherein the calculation unit groups the location coordinates of the access points extracted by the extracting unit and calculates the barycentric coordinates of a first group, and groups the calculated barycentric coordinates into a second group and calculates a barycentric coordinate of the second group in a repetitive manner to obtain a final barycentric coordinate of a triangle having apices of the calculated barycentric coordinates grouped into the second group.

20. The apparatus for measuring the location of the communication terminal according to claim 12,
wherein the extracting unit extracts information of a set of top M access points of the access points based on signal strength information of the access points, and
wherein M is a natural number greater than or equal to two.

21. The apparatus for measuring the location of the communication terminal according to claim 12,
wherein the extracting unit extracts information of the set of top M access points of the access points based on signal strength information of the access points, and
wherein M is equal to $K^n$ where K is a natural number of 3 or more and n is a natural number of 1 or more.

22. The method for measuring the location of the communication terminal according to claim 1,
wherein the access points are wireless local area network devices,
wherein the access point information comprises identity information of an access point, and
wherein the identity information comprises at least one of a media access control address and a service set identifier of the access point.

23. The method for measuring the location of the communication terminal according to claim 10,
wherein the access point information comprises identity information of an access point, and
wherein the identity information comprises at least one of a media access control address and a service set identifier of the access point.

24. The apparatus for measuring the location of the communication terminal according to claim 12,
wherein the access point information comprises identity information of an access point, and
wherein the identity information comprises at least one of a media access control address and a service set identifier of the access point.

* * * * *